(12) United States Patent
Sawai

(10) Patent No.: US 10,375,704 B2
(45) Date of Patent: Aug. 6, 2019

(54) COMMUNICATION CONTROL DEVICE, COMMUNICATION CONTROL METHOD, COMMUNICATION SYSTEM AND COMMUNICATION DEVICE

(75) Inventor: Ryo Sawai, Tokyo (JP)

(73) Assignee: SONY CORPORATION, Tokyo (JP)

( * ) Notice: Subject to any disclaimer, the term of this patent is extended or adjusted under 35 U.S.C. 154(b) by 243 days.

(21) Appl. No.: 13/807,825

(22) PCT Filed: Jun. 15, 2011

(86) PCT No.: PCT/JP2011/063659
§ 371 (c)(1),
(2), (4) Date: Dec. 31, 2012

(87) PCT Pub. No.: WO2012/005093
PCT Pub. Date: Jan. 12, 2012

(65) Prior Publication Data
US 2013/0100893 A1 Apr. 25, 2013

(30) Foreign Application Priority Data

Jul. 7, 2010 (JP) ................................ P2010-155117
Oct. 29, 2010 (JP) ................................ P2010-243788

(51) Int. Cl.
*H04W 8/22* (2009.01)
*H04W 16/14* (2009.01)
(Continued)

(52) U.S. Cl.
CPC ........... *H04W 72/10* (2013.01); *H04W 16/14* (2013.01); *H04W 8/22* (2013.01); *H04W 48/16* (2013.01); *H04W 72/00* (2013.01)

(58) Field of Classification Search
USPC ........................................................ 370/328
See application file for complete search history.

(56) References Cited

U.S. PATENT DOCUMENTS 7,146,176 B2 * 12/2006 McHenry .................. 455/454
8,401,478 B2 * 3/2013 Kwak et al. ............... 455/62
(Continued)

FOREIGN PATENT DOCUMENTS

| CN | 101146263 A | 3/2008 |
|---|---|---|
| EP | 1 890 433 A2 | 2/2008 |
| WO | WO 2010/043270 A1 | 4/2010 |

OTHER PUBLICATIONS

Wang, Sherry; and Zheng, Harold; A Resource Management Design for Cognitive Radio Ad Hoc Networks.*
(Continued)

*Primary Examiner* — Peter G Solinsky
(74) *Attorney, Agent, or Firm* — Xsensus, LLP

(57) ABSTRACT

Provided is a communication control device controlling communication of one or more secondary usage nodes respectively providing second communication services using a part of a frequency band assigned to a first communication service, the communication control device including a communication unit receiving access technique information indicating radio access techniques usable by the corresponding secondary usage nodes from the respective secondary usage nodes, a storage unit storing the access technique information received by the communication unit, and a control unit that, when at least a portion of a service area of a second-order second communication service is included in a service area of a first-order second communication service, determines whether at least a part of communication resources can be shared between the first-order and the second-order second communication services based on the radio access techniques of the first-order and the second-order second communication services indicated by the access technique information.

16 Claims, 13 Drawing Sheets

(51) Int. Cl.
*H04W 48/16* (2009.01)
*H04W 72/00* (2009.01)
*H04W 72/10* (2009.01)

(56) References Cited

U.S. PATENT DOCUMENTS

| | | | | |
|---|---|---|---|---|
| RE44,492 E | * | 9/2013 | McHenry | 455/454 |
| 8,532,650 B2 | * | 9/2013 | Goldsmith | 455/434 |
| 8,666,421 B2 | * | 3/2014 | Xu et al. | 455/446 |
| 8,675,511 B2 | * | 3/2014 | Gorokhov et al. | 370/252 |
| 8,688,046 B2 | * | 4/2014 | Hershey et al. | 455/62 |
| 8,711,728 B2 | * | 4/2014 | Rofougaran | 370/252 |
| 8,712,426 B2 | * | 4/2014 | Stine | 455/454 |
| 8,717,922 B2 | * | 5/2014 | Xin et al. | 370/252 |
| 9,078,196 B2 | | 7/2015 | Kim et al. | |
| 2006/0083205 A1 | | 4/2006 | Buddhikot et al. | 370/338 |
| 2006/0221918 A1 | * | 10/2006 | Wang | 370/338 |
| 2008/0009307 A1 | * | 1/2008 | Sekhar et al. | 455/524 |
| 2008/0311938 A1 | * | 12/2008 | Song | 455/500 |
| 2009/0011788 A1 | | 1/2009 | Shan et al. | |
| 2009/0029692 A1 | * | 1/2009 | Radermacher et al. | 455/418 |
| 2009/0232066 A1 | * | 9/2009 | Rinne et al. | 370/329 |
| 2009/0323608 A1 | * | 12/2009 | Adachi | H04W 72/0453 370/329 |
| 2010/0020760 A1 | * | 1/2010 | Grandblaise et al. | 370/330 |
| 2010/0091701 A1 | | 4/2010 | Youn et al. | |
| 2010/0124940 A1 | * | 5/2010 | Hassan et al. | 455/509 |
| 2010/0144334 A1 | | 6/2010 | Gorokhov et al. | |
| 2010/0158078 A1 | * | 6/2010 | Ro | H04B 1/7143 375/135 |
| 2010/0216480 A1 | * | 8/2010 | Park et al. | 455/450 |
| 2010/0220687 A1 | * | 9/2010 | Reznik | H04W 36/005 370/331 |
| 2010/0246434 A1 | * | 9/2010 | Wang et al. | 370/253 |
| 2010/0291938 A1 | * | 11/2010 | Jang | 455/450 |
| 2010/0309806 A1 | * | 12/2010 | Wu | H04H 20/423 370/252 |
| 2011/0087639 A1 | * | 4/2011 | Gurney | G06F 17/30442 707/690 |
| 2011/0090887 A1 | * | 4/2011 | Kim et al. | 370/338 |
| 2011/0124291 A1 | * | 5/2011 | Gurney et al. | 455/63.2 |
| 2011/0176644 A1 | * | 7/2011 | Sadek | 375/345 |
| 2011/0222488 A1 | * | 9/2011 | Kim et al. | 370/329 |
| 2011/0246411 A1 | * | 10/2011 | Laneman et al. | 706/52 |
| 2011/0250858 A1 | * | 10/2011 | Jain | H04W 16/14 455/120 |
| 2011/0263209 A1 | * | 10/2011 | Kasslin et al. | 455/67.11 |
| 2011/0268095 A1 | * | 11/2011 | Kim et al. | 370/338 |
| 2011/0287802 A1 | * | 11/2011 | Ma | H04L 5/0066 455/517 |
| 2011/0299479 A1 | * | 12/2011 | Deb | H04W 28/18 370/329 |
| 2011/0300891 A1 | * | 12/2011 | Deb | H04J 11/0023 455/510 |
| 2011/0307612 A1 | * | 12/2011 | Junell et al. | 709/226 |
| 2012/0014332 A1 | * | 1/2012 | Smith et al. | 370/329 |
| 2012/0039284 A1 | * | 2/2012 | Barbieri et al. | 370/329 |
| 2012/0071168 A1 | * | 3/2012 | Tomici | H04W 76/025 455/445 |
| 2012/0093092 A1 | * | 4/2012 | Kasslin et al. | 370/329 |
| 2012/0106464 A1 | * | 5/2012 | Ma et al. | 370/329 |
| 2013/0003581 A1 | * | 1/2013 | Marque-Pucheu et al. | 370/252 |
| 2013/0225224 A1 | * | 8/2013 | Rofougaran | 455/522 |
| 2013/0231121 A1 | * | 9/2013 | Kwak et al. | 455/450 |
| 2013/0235807 A1 | * | 9/2013 | Lee et al. | 370/329 |
| 2013/0265965 A1 | * | 10/2013 | Amini et al. | 370/329 |
| 2013/0301609 A1 | * | 11/2013 | Smith et al. | 370/331 |
| 2013/0303229 A1 | * | 11/2013 | Kim et al. | 455/522 |
| 2013/0336224 A1 | * | 12/2013 | Davydov et al. | 370/328 |
| 2013/0337749 A1 | * | 12/2013 | Wang et al. | 455/41.2 |
| 2013/0343283 A1 | * | 12/2013 | Laroia et al. | 370/328 |
| 2013/0343341 A1 | * | 12/2013 | Kim et al. | 370/330 |
| 2014/0029561 A1 | * | 1/2014 | Kim et al. | 370/329 |
| 2014/0050209 A1 | * | 2/2014 | Bajko et al. | 370/338 |
| 2014/0066086 A1 | * | 3/2014 | Jo et al. | 455/454 |
| 2014/0086212 A1 | * | 3/2014 | Kafle et al. | 370/331 |
| 2014/0087778 A1 | * | 3/2014 | Kim et al. | 455/515 |
| 2016/0270090 A1 | * | 9/2016 | Ahmad | H04W 72/082 |

OTHER PUBLICATIONS

Li, Cuiran; Li, Chengshu; Opportunistic Spectrum Access in Cognitive Radio Networks, 2008 International Joint Conference on Neural Networks.*

Baykas, T. et al., "Wireless Coexistence: System Design Document," IEEE P802.19, doc.: IEEE 802.19-10/0055r3, pp. 1-15, (Mar. 2010).

Sawai, R. et al., "Wireless Coexistence: Coexistence Mechanism and Its Algorithm," IEEE P802.19, doc. IEEE 802.19-10/0145r0, pp. 1-33, (Nov. 2010).

Villardi, G. P. et al., "Coexistence of Multiple Secondary Networks in TVWS (Distributed Beason Approach)" doc. IEEE 802.19-10/0072r0, pp. 1-16, (May 2010).

Communication issued by the State Intellectual Property Office of People's Republic, dated Jan. 26, 2015, and an English language translation thereof; 15 pages.

Supplementary European Search Report dated Jun. 29, 2017 in European Patent Application No. 11 803 429.7.

* cited by examiner

CLASS A

CLASS B

CLASS C

CLASS D

COMMUNICATION CONTROL DEVICE, COMMUNICATION CONTROL METHOD, COMMUNICATION SYSTEM AND COMMUNICATION DEVICE

TECHNICAL FIELD

The present invention relates to a communication control device, a communication control method, a communication system and a communication device.

BACKGROUND ART

Recently, discussions for enabling a primarily used frequency band (spectrum) to be used in a second communication service according to the use condition of the frequency band have been in progress. For example, a standard specification for allowing an unused channel (TV white space) included in the frequency band of US digital TV broadcasting to be available for radio communication is under examination in IEEE802.22 working group (see Non-Patent Literature 1 below).

According to a recommendation of the Federal Communications Commission (FCC) on November 2008, the discussions have been directed toward permitting secondary usage of the TV white space by using a communication device that fulfills a predetermined condition and has received an authentication. This recommendation of FCC accepts the standard specification of IEEE802.22, which is the first standardization of secondary usage of the TV white space, and also covers the activities of a new study group in IEEE. Technically, since it is necessary to perform signal detection at a level of −114 [dBm] (SNR is about −19 [dB] when Noise Figure (NF) is 11 [dB], for example) using existing technology for example, an auxiliary function such as Geo-location Database Access is expected to be necessary (see Non-Patent Literature 2 below). Also, FCC is under examination for opening a 250-MHz band, which is a part of a 5-GHz band, as a new channel for secondary usage.

Furthermore, in the EU, there are moves afoot to universally allocate a dedicated control channel referred to as Cognitive Pilot Channel (CPC) for implementing Dynamic Spectrum Access (DSA) under a long-term strategy. Allocation of CPC has been incorporated in the agenda of International Telecommunication Union (ITU)-WP11 in 2011. Technological studies for a secondary usage system that performs DSA are also under way in the IEEE Standards Coordinating Committee (SCC) 41.

In general, when a frequency band assigned to a communication service related to primary usage (will be referred to as a first communication service below) is secondarily used, it is important that a communication service related to secondary usage (will be referred to as a second communication service below) not interfere with the first communication service. For this reason, Non-Patent Literature 2 below recommends installation of a data server that receives administrator information, location information, and the like from a secondary usage node which will provide a second communication service and accumulates these pieces of information in a database. In this case, the data server specifies a channel that can be provided for secondary usage according to a request from the secondary usage node, and notifies the secondary usage node of the specified channel. When the secondary usage node uses the channel notified in this way by the data server, interference with a first communication service is prevented.

CITATION LIST

Non-Patent Literature

Non-Patent Literature 1: "IEEE802.22 WG on WRA.Ns," [online], [searched Jul. 1, 2010], Internet <URL: http://www.ieee802.org/22/>

Non-Patent Literature 2: "SECOND REPORT AND ORDER AND MEMORANDUM OPINION AND ORDER," [online], [searched Jul. 1, 2010], Internet http://hraunfoss.fcc.gov/edocs_public/attachmatch/FCC-08-260A1.pdf>

SUMMARY OF INVENTION

Technical Problem

However, when only the aforementioned information provided by the data server is used, there are a plurality of secondary usage nodes, and there is still a risk that a problem such as interference, signal collision, or the like between second communication services will occur in a situation in which the plurality of second communication services can be provided. Also, when a plurality of second communication services are separately provided without cooperation with each other, it is difficult to achieve high efficiency in frequency usage. Accordingly; it is preferable for respective second communication services to be provided after configurations for secondary usage such as radio access techniques, channels, and the like are mutually adjusted. In particular, even when service areas and channels overlap, there are cases in which communication resources can be shared according to a combination of radio access techniques, in these cases, by sharing the communication resources, it is possible to improve efficiency in frequency usage or increase opportunities for secondary usage.

For this reason, technology related to the present disclosure provides a new and improved communication control device, communication control method, communication system, and communication device that support sharing of communication resources between a plurality of second communication services.

Solution to Problem

According to an embodiment of the present disclosure, there is provided a communication control device which controls communication of one or more secondary usage nodes respectively providing second communication services using a part of a frequency band assigned to a first communication service, the communication control device including a communication unit that receives access technique information indicating radio access techniques usable by the corresponding secondary usage nodes from the respective secondary usage nodes, a storage unit that stores the access technique information received by the communication unit, and a control unit that, when at least a portion of a service area of a second-order second communication service is included in a service area of a first-order second communication service, determines whether or not at least a part of communication resources can be shared between the first-order second communication service and the second-order second communication service on the basis of the radio access techniques of the first-order second communication service and the second-order second communication service indicated by the access technique information.

The control unit may determine whether or not a part of the communication resources can be shared between the first-order second communication service and the second-order second communication service, if the service area of the second-order second communication service is not included in the service area of the first-order second communication service, even when a level of mutual interference between the first-order second communication service and the second-order second communication service exceeds an allowable interference level.

The control unit may determine that a part of the communication resources can be shared, when a radio access technique indicated by the access technique information corresponding to the first-order second communication service is OFDMA.

The control unit may determine that a part of the communication resources can be shared, when a radio access technique indicated by the access technique information corresponding to the first-order second communication service is OFDMA, and a radio access technique indicated by the access technique information corresponding to the second-order second communication service is CSMA.

The control unit may determine whether or not a part of the communication resources can be shared in response to a request from a secondary usage node providing the second-order second communication service.

The control unit may request a secondary usage node providing the first-order second communication service to provide information specifying a range of shamble communication resources, when it is determined that a part of the communication resources can be shared.

The control unit may provide the information specifying the range of sharable communication resources received from the secondary usage node providing the first-order second communication service to a secondary usage node providing the second-order second communication service.

The control unit may supply a synchronization signal to the secondary usage nodes respectively providing the first-order second communication service and the second-order second communication service, when there are shamble communication resources.

The control unit may transmit control information for preventing interference caused by sharing the communication resources to a secondary usage node providing the second-order second communication service, when there are sharable communication resources.

The communication unit may further receive the service area information from the respective secondary usage nodes. The communication control device may further include an estimation unit that estimates a service area of the first-order second communication service and a service area of the second-order second communication service using service area information for estimating the service areas of the second communication services provided by the secondary usage nodes.

The control unit may reduce the service area of the second-order second communication service in order to share the communication resources, when no portion of the service area of the second-order second communication service is included in the service area of the first-order second communication service.

Further, according to another embodiment of the present disclosure, there is provided a communication control method for controlling communication of a plurality of secondary usage nodes respectively providing second communication services using a part of a frequency band assigned to a first communication service, the communication control method including receiving access technique information indicating radio access techniques usable by the corresponding secondary usage nodes from the respective secondary usage nodes, storing the received access technique information, and when at least a portion of a service area of a second-order second communication service is included in a service area of a first-order second communication service, determining whether or not at least a part of communication resources can be shared between the first-order second communication service and the second-order second communication service on the basis of the radio access techniques of the first-order and second-order second communication services indicated by the access technique information.

Further, according to another embodiment of the present disclosure, there is provided a communication system which includes a plurality of secondary usage nodes respectively providing second communication services using a part of a frequency band assigned to a first communication service and a communication control device controlling communication of the plurality of secondary usage nodes. Each of the secondary usage nodes includes a communication unit that transmits access technique information indicating radio access techniques usable by the corresponding secondary usage nodes to the communication control device. The communication control device includes a communication unit that receives the access technique information from the respective secondary usage nodes, a storage unit that stores the access technique information received by the communication unit, and a control unit that, when at least a portion of a service area of a second-order second communication service is included in a service area of a first-order second communication service, determines whether or not at least a part of communication resources can be shared between the first-order second communication service and the second-order second communication service on the basis of the radio access techniques of the first-order second communication service and the second-order second communication service indicated by the access technique information.

Further, according to another embodiment of the present disclosure, there is provided a communication device which provides a second communication service using a part of a frequency band assigned to a first communication service, the communication device including a communication unit that transmits access technique information indicating a radio access technique usable by the communication device to another device in order to cause the other device to determine whether or not it is necessary to share a part of communication resources of the second communication service with another second communication service, and a secondary usage control unit that specifies a range of communication resources sharable with the other second communication service in response to a request from the other device when the other device determines that a service area of the second communication service includes a service area of the other second communication service, and it is necessary to share a part of the communication resources of the second communication service on the basis of the access technique information.

Advantageous Effects of Invention

As described above, according to the communication control device, the communication control method, the communication system, and the communication device related to the present disclosure, it is possible to support sharing of communication resources between a plurality of second communication services.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

"Embodiments for Implementing Invention" will be described according to the following sequence.

Figure 1:
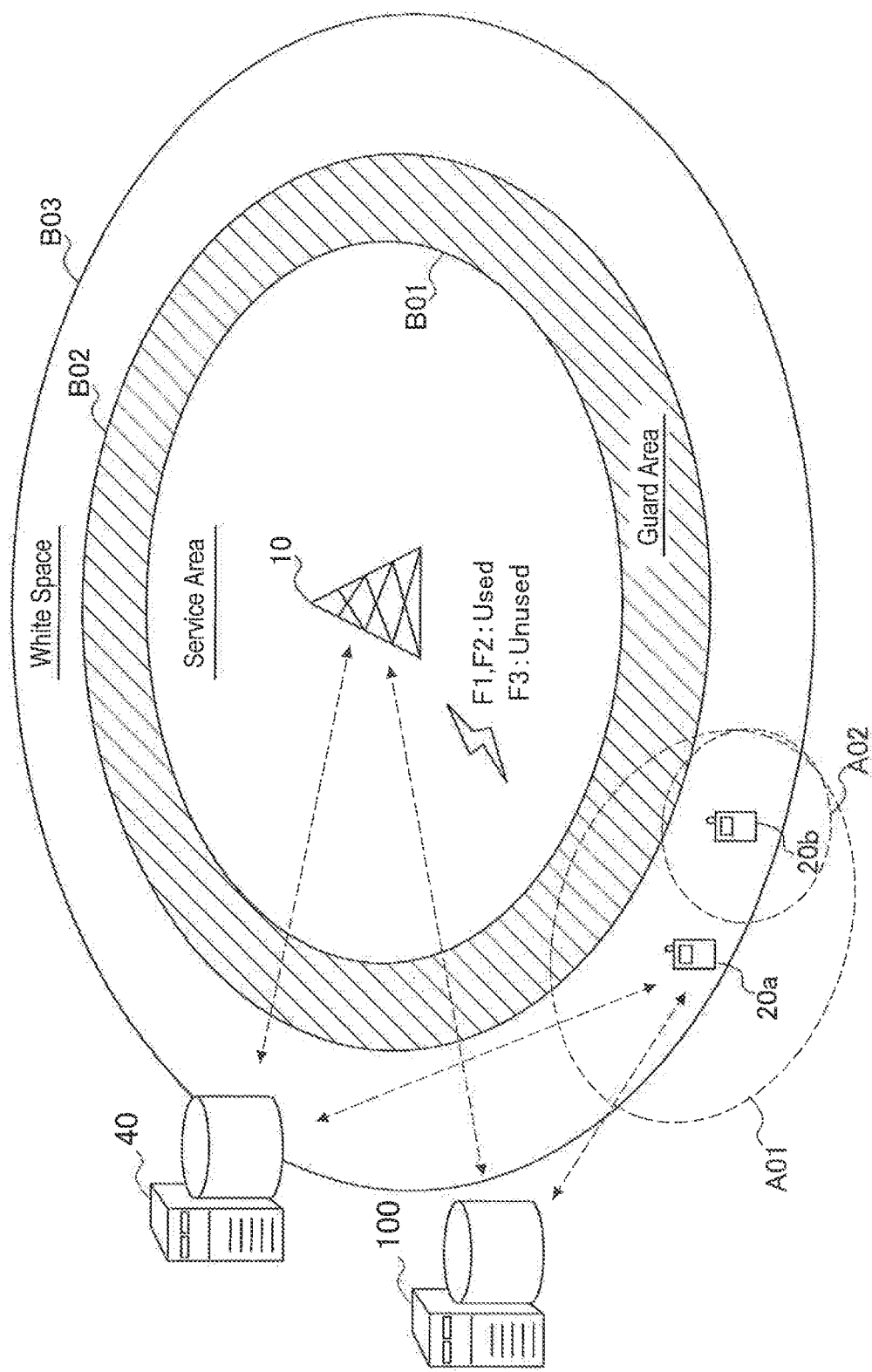
FIG. 1 is an explanatory diagram illustrating an outline of a communication system related to one embodiment.

1. Outline of System
2. Example of Configuration of Device Related to One Embodiment
2-1. Example of Configuration of Communication Control Device
2-2. Example of Location Relationship Between Service Areas
2-3. Example of Configuration of Secondary Usage Node
3. Flow of Process Related to One Embodiment
3-1. Communication Control Process
3-2. Service Area Determination Process
3-3. Process of Determining Recommended Service Configuration
3-4. Process of Supporting Sharing of Communication Resources
4. Summarization 1. Outline of System FIG. 1 is an explanatory diagram illustrating an outline of a communication system related to one embodiment. Referring to FIG. 1, a primary usage node 10, secondary usage nodes 20a and 20b, a data server 40, and a communication control device 100 are shown.

The primary usage node 10 is a node that transmits/receives radio signals for a first communication service using a frequency band which has been assigned in advance. However, the primary usage node 10 does not necessarily use the assigned whole frequency hand. In the example of FIG. 1, a frequency band including channels F1, F2 and F3 has been assigned, but the primary usage node 10 is using only the channel F1 and F2 among them. The first communication service may be an arbitrary communication service including, for example, a digital TV broadcasting service, a satellite communication service, a mobile communication service, or the like. In addition, for example, when the first communication service is a mobile communication service, the primary usage node 10 can correspond to a base station.

A boundary B01 shown in FIG. 1 is an external boundary of a service area of the first communication service provided by the primary usage node 10. A terminal device (not shown) that is located within the boundary B01 can receive the first communication service provided by the primary usage node 10. A boundary B02 is an external boundary of a guide area set around the service area of the first communication service. The guide area is a buffer area set between the service area of the first communication service and a so-called white space. Since there is the guide area, even when a frequency band is secondarily used in the white space, a probability that a problem such as interference will occur in the terminal device located in the service area is reduced.

Between the boundary B02 and a boundary B03, the so-called white space is present. In the example of FIG. 1, the secondary usage nodes 20a and 20b are located in the white space. Each of the secondary usage nodes 20a and 20b is a communication device that provides a second communication service using a part of the frequency band assigned to the first communication service. In the following description of this specification, when there is no particular necessity to distinguish the secondary usage nodes 20a and 20b from each other, letters at the ends of the symbols are omitted, and the secondary usage nodes 20a and 20b will be generally referred to as secondary usage nodes 20.

A secondary usage node 20 determines whether or not secondary usage is available according to a predetermined spectrum policy, receives a channel provided by the data server 40, and then provides a second communication service to terminal devices (not shown) located around it. In the example of FIG. 1, the channel F3 which is not used by the primary usage node 10 may be provided to both the secondary usage node 20a and the secondary usage node 20b. Note that without being limited to the example of FIG. 1, the secondary usage node 20 may be located in the service area of the first communication service or around the service area. For example, in order to cover a spectrum hole that is generated in the service area due to the influence of shadowing (shielding), fading, or the like, a secondary usage node may be installed in the service area of the first communication service.

The second communication service typically denotes an additional or substitutionary communication service that is provided using a part or the whole of a frequency band assigned to the first communication service. In the meaning of the term "secondary usage," the first communication service and the second communication service may be communication services of different types or services of the same type. Communication services of different types denote communication services of two or more different types that can be selected from arbitrary communication services, for example, a digital TV broadcasting service, a satellite communication service, a mobile communication service, a wireless LAN access service, a Peer-To-Peer (P2P) connection service, and the like. On the other hand, services of the same type can include a relationship between a service based on a macro-cell provided by a communication provider, for example, of a mobile communication service, and a service based on a femto-cell managed by a user or a Mobile Virtual Network Operator (MVNO). In addition, services of the same type can also include a relationship between a service provided by a base station of a communication service according to WiMAX, Long Term Evolution (LTE), Advanced (LTE-A), or the like and a service provided by a relay station (relay node) to cover a spectrum hole. Also, the second communication service may be a service that uses a plurality of fragmentary frequency bands aggregated using spectrum aggregation technology. Furthermore, the second communication service may be a supplementary communication service that is provided by a femto-cell group, a relay station group, or a small or medium-sized base station group, which provides a smaller service area than a base station, present within a service area of the base station. The outline of each embodiment described in this specification is widely applicable to every type of mode of such secondary usages.

The data server 40 has a database that receives node information including administrator information, location information, and the like from the secondary usage node 20 and accumulates the received node information. The data server 40 can be connected with the primary usage node 10 and the secondary usage node 20 via, for example, the Internet, a backbone network of the first communication service, or the like. The data server 40 accumulates the aforementioned node information received from the secondary usage node 20. Also, according to a request from the secondary usage node 20, the data server 40 provides information, for example, a channel that can be provided for secondary usage, maximum transmission power, a spectrum mask, and the like to the secondary usage node 20. In this way, the secondary usage node 20 becomes able to start the second communication service.

Figure 2:
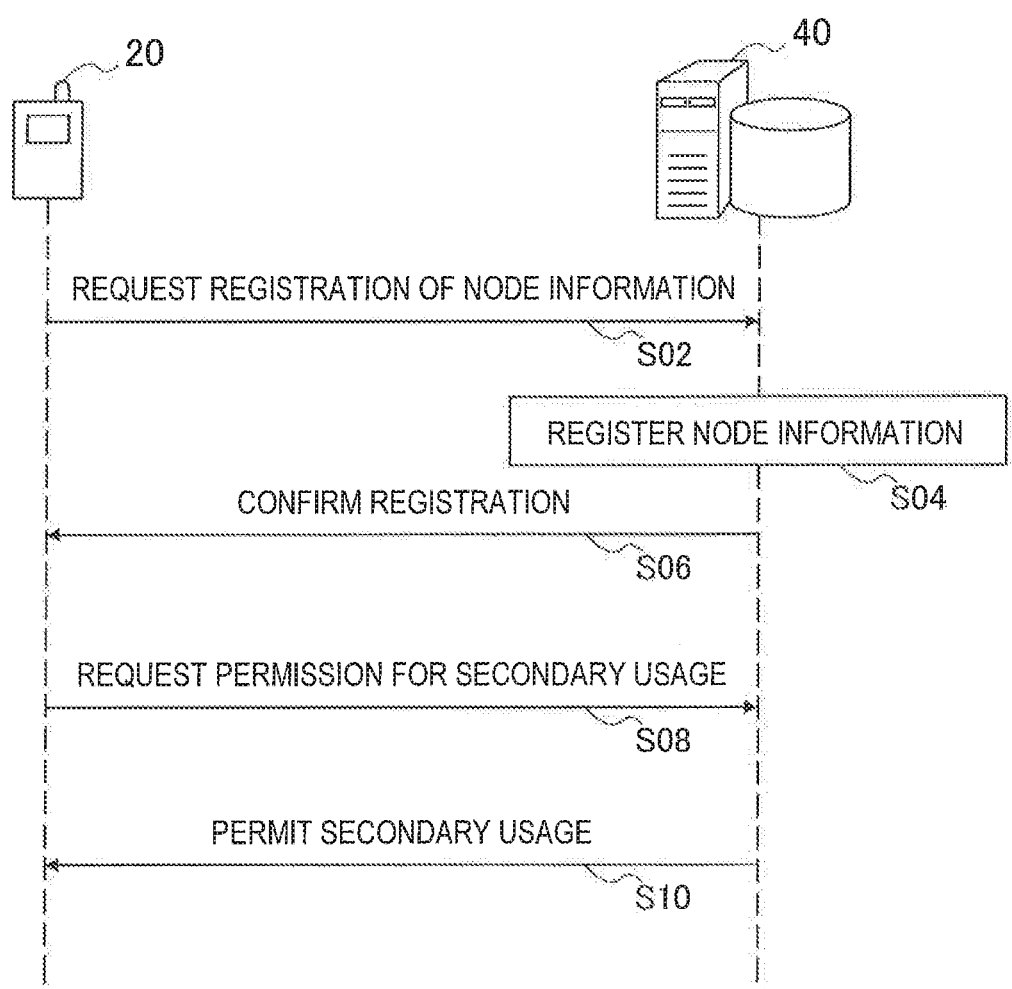
FIG. 2 is a sequence diagram showing an example of the flow of a process between a secondary usage node and a data server.

FIG. 2 is a sequence diagram showing an example of the flow of a process between the secondary usage node 20 and the data server 40 exemplified in FIG. 1, Referring to FIG. 2, the secondary usage node 20 that will secondarily use a frequency band assigned to the first communication service transmits node information to the data server 40 first, thereby requesting registration of the node information (step S02). Then, the data server 40 registers the node information received from the secondary usage node 20 in a database (step S04).

Here, the node information registered in the database includes, for example, the following information:

Regulation ID: an ID given when a node is authenticated as a device that can be used for secondary usage. The regulation ID can be included in node information in the case of secondary usage of a TV white space.

Manufacturer ID: an ID of a manufacturer of the device.

Location Data: indicates a location of the device that is dynamically measured using a positioning means such as GPS, or kept stationary.

Antenna Height: a height of an antenna of the device. For example, Height Above Average Terrain of the tx (HAAT) can be used.

Administrator Information: includes a device owner's name, address, mail address, and the like.

Next, the data server 40 transmits an acknowledgement signal (confirmation) confirming that registration of the node information has been finished to the secondary usage node 20 (step S06). Next, the secondary usage node 20 requests permission for secondary usage from the data server 40 (step S08). Then, the data server 40 determines, for example, a channel that can be provided to the secondary usage node 20 (for example, an unused part of a frequency band assigned to the first communication service), and permits secondary usage to the secondary usage node 20 when there is a providable channel (step S10).

In step S10, the data server 40 provides the secondary usage node 20 with, for example, the following information:

Maximum Transmission Power: a maximum of transmission power at which the secondary usage node 20 is allowed to perform radiation.

Permissible Channel Information: a list of channel numbers specifying channels that can be provided to the secondary usage node 20. The frequency band assigned to the first communication service can be divided into a plurality of channels in advance, and channel numbers can be given to the respective channels. Instead of the channel numbers, center frequencies of the channels may be used.

Regulatory Information; can include rules for secondary usage such as a spectrum mask.

In this specification, these pieces of information that are provided from the data server 40 to the secondary usage node 20 are referred to as grant information.

After these steps, the secondary usage node 20 can start secondary usage of the frequency hand assigned to the first communication service.

The communication control device 100 is a communication device that controls communication of one or more secondary usage nodes 20. Like the data server 40, the communication control device 100 also can be connected with the primary usage node 10 and the secondary usage nodes 20 via, for example, the Internet, the backbone network of the first communication service, or the like. The communication control device 100 may be physically the same device as the database 40. The communication control device 100 adjusts a configuration of radio access techniques, channels, and the like of second communication services provided by the respective secondary usage nodes 20 between the plurality of second communication services using node information about the secondary usage nodes 20, information provided by the data server 40, and the like. Accordingly, in the cases in which communication resources can be shared according to a combination of radio access techniques, the communication control device 100 supports sharing of communication resources between a plurality of second communication services, as will be described in detail in the next chapter.

2. Example of Configuration of Device Related to One Embodiment

[2-1. Example of Configuration of Communication Control Device]

Figure 3:
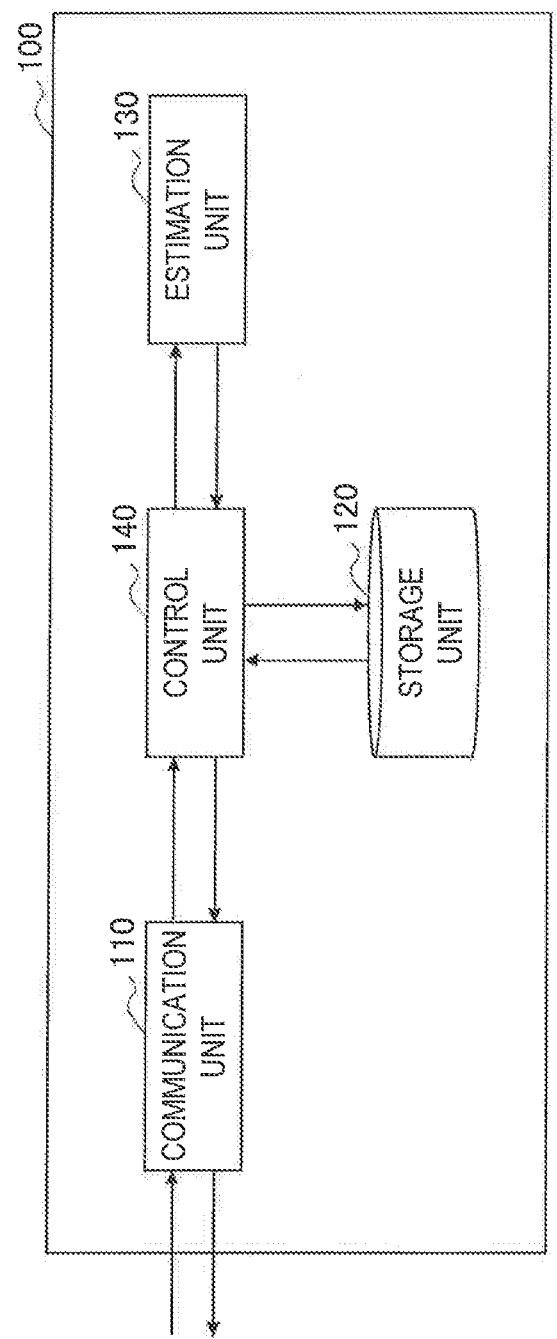
FIG. 3 is a block diagram showing an example of a configuration of a communication control device related to one embodiment.

FIG. 3 is a block diagram showing an example of a configuration of the communication control device 100 related to this embodiment. Referring to FIG. 3, the communication control device 100 includes a communication unit 110, a storage unit 120, an estimation unit 130, and a control unit 140.

(Communication Unit)

The communication unit 110 is a communication interface for the communication control device 100 to communicate with the secondary usage nodes 20. In addition, the communication unit 110 may be able to communicate with the data server 40. In this embodiment, the communication unit 110 receives a request for registration of secondary usage from, for example, each secondary usage node 20 to which secondary usage is permitted.

The request for registration of secondary usage includes, for example, the following information:
- Regulation ID: information that can be registered as node information in a data server.
- Manufacturer ID: information that can be registered as node information in a data server.
- Location Data: information that can be registered as node information in a data server.
- Antenna Height: information that can be registered as node information in a data server.
- Maximum Transmission Power: information that can be provided as grant information from a data server,
- Permissible Channel Information: information that can be provided as grant information from a data server,
- Regulatory Information: information that can be provided as grant information from a data server.
- Utilization Channel Information: a number of a channel that a secondary usage node will use for a second communication service among channels included in a list of permissible channel information.
- Access Technique Information: a list of access technique numbers indicating radio access techniques that can be used (and are currently in use) by a secondary usage node. The numbers can be given in advance according to each radio access technique such as IEEE802.11af, 11g or 11n, IEEE802.22, IFEE802.16, LTE, LTE-A, or the like. Instead of a list of access technique numbers, the access technique information may include a bit string, a code value, or the like that indicates whether or not respective radio access techniques are supported. Also, the access technique information may include information indicating whether or not a protocol for coexistence of communication services, which will be described later, can be used.

In this embodiment, the communication control device 100 handles the location data, the antenna height, and the maximum transmission power among these pieces of information as service area information for estimating a service area of a second communication service provided by the secondary usage node 20. The information mentioned here is merely an example. In other words, the request for registration of secondary usage that is transmitted from the secondary usage node 20 to the communication control device 100 may not include a part of the aforementioned information, or may further include additional information. Also, the communication control device 100 may acquire a part of the aforementioned information not from the secondary usage node 20 but from the data server 40.

The communication unit 110 stores information received from each secondary usage node 20 in the storage unit 120. Also, the communication unit 110 receives an adjustment request from a secondary usage node 20 that requests an adjustment between second communication services. The adjustment request from the secondary usage node 20 is processed by the control unit 140 which will be described later.

(Storage Unit)

The storage unit 120 is implemented using a storage medium, for example, a hard disc, a semiconductor memory, or the like. In this embodiment, the storage unit 120 stores information included in the registration request that is received by the communication unit 110. Among the information stored in the storage unit 120, the service area information including the location data, the antenna height, and the maximum transmission power of the secondary usage node 20 can be used by the estimation unit 130, which will be described later, to estimate a service area. Also, the permissible channel information, the utilization channel information, and the access technique information can be used for an adjustment between second communication services by the control unit 140 which will be described later.

(Estimation Unit)

The estimation unit 130 estimates a service area of the second communication service provided by the secondary usage node 20 using the service area information stored by the storage unit 120, that is, the location data, the antenna height, and the maximum transmission power of the secondary usage node 20. For example, the estimation unit 130 approximates that the service area of the second service provided by the secondary usage node 20 is a circular area centered on the location of the secondary usage node 20.

As methods for estimating a radius of a service area, two methods are considered. A first method is a method that is disclosed in "Method for point-to-area predictions for terrestrial services in the frequency range 30 mhz to 3000 mhz" (International Telecommunications Commission (ITU), RECOMMENDATION ITU-R P1546-3, 2007) and uses a propagation path curve. In this case, a statistical curve (propagation path curve) that is based on an actual measurement value for deriving a communication distance (a distance at which communication is enabled with a predetermined location rate and a predetermined time rate) from an antenna height and electric field intensity is stored in advance by the storage unit 120. The estimation unit 130 converts the maximum transmission power of the secondary usage node 20 into electric field intensity, and acquires a communication distance corresponding to the antenna height and electric field intensity of the secondary usage node 20 from the propagation path curve stored in the storage unit 120. This communication distance becomes a radius of the service area of the second communication service provided by the secondary usage node 20.

A second method for estimating a radius of a service area is a method employing an evaluation formula in the urban model of Okumura-Hata curve (see "Digital Wireless Transmission Technology" (written by Seiichi Sampei, Pearson Education Japan, pp. 16-19)). In this case, the estimation unit 130 calculates a maximum allowable path loss from the maximum transmission power of the secondary usage node 20 and a minimum reception sensitivity of a receiver. Then, the estimation unit 130 substitutes the calculated path loss and the antenna height in the evaluation formula, thereby calculating a communication distance. This communication distance becomes a radius of the service area of the second communication service provided by the secondary usage node 20.

The estimation unit 130 causes the storage unit 120 to store a value that is estimated in this way and indicates a service area of a second communication service of each secondary usage node 20 (for example, a center position and a radius of a circle).

(Control Unit)

The control unit 140 adjusts a configuration for secondary usage between second communication services on the basis of a location relationship between service areas estimated by the estimation unit 130 and a radio access technique that can be used by the secondary usage nodes 20. The adjustment of a configuration for secondary usage between second communication services includes a recommendation about a radio access technique or a recommendation about a channel to be used for at least one secondary usage node 20 in terms of, for example, increase in secondary usage opportunities, improvement in frequency use efficiency, or the like, in addition, the control unit 140 determines whether or not a part of communication resources of a first-order second communication service can be shared with a second-order second communication service according to a location relationship between a service area of the first-order second communication service and a service area of the second-order second communication service.

For example, when a radio access technique indicated by access technique information corresponding to the first-order second communication service is OFDMA, the control unit 140 may determine that a part of the communication resources can be shared. For example, IEEE803.22 is a radio communication protocol that is also referred to as a Wireless Regional Area Network (WRAN) and employs OFDMA. In a radio communication protocol that employs OFDMA, communication resources can be divided into relatively small units that are referred to as sub-carriers in a frequency direction and symbols in a time direction. A base station schedules communication in units of resource blocks that include a predetermined number of sub-carriers and a predetermined number of symbols. In this embodiment, the base station can correspond to a secondary usage node 20 that provides the first-order second communication service. Accordingly, in this case, the control unit 140 negotiates with the secondary usage node 20 that provides the first-order second communication service using OFDMA, receives the distribution of sharable communication resources, and thereby can implement sharing of communication resources. In other words, when a radio access technique of the first-order second communication service is OFDMA, it is easier to implement sharing of communication resources in comparison with a case in which another radio access technique is employed.

Furthermore, for example, when a radio access technique indicated by the access technique information corresponding to the second-order second communication service is CSMA, the control unit 140 may determine that a part of the communication resources can be shared. For example, IEEE802.11 (11a, 11b, 11g, 11n, or the like) is a radio communication protocol that employs Carrier Sense Multiple Access with Collision Avoidance (CSMA/CA). Unlike OFDMA, CSMA is a technique in which a base station does not schedule communication in a centralized manner, but rather, a terminal device can start communication at an arbitrary timing according to a predetermined collision avoidance (or collision detection) sequence. Thus, the second-order second communication service employing CSMA is appropriate for flexibly performing communication according to a timing in a section of communication resources that is determined to be distributed from the first-order second communication service.

When it is determined that a part of the communication resources can be shared, the control unit 140 requests sharing of the communication resources from the secondary usage node 20 providing the first-order second communication service. This request demands provision of shared resource information for specifying a range of sharable communication resources, in order to specify the range of sharable communication resources, the shared resource information can include information, for example, a start timing, an end timing, a period, a center frequency (or a channel number), and the like of the sharable communication resources. When the shared resource information is received from the secondary usage node of the first-order second communication service, the control unit 140 transmits the shared resource information to a secondary usage node 20 of the second-order second communication service, thereby supporting sharing of communication resources. Also, in order to support, for example, synchronization with the secondary usage node 20 of the first-order second communication service by the secondary usage node 20 of the second-order second communication service, the control unit 140 may supply a synchronization signal to the respective secondary usage nodes 20 through the communication unit 110.

Figure 4:
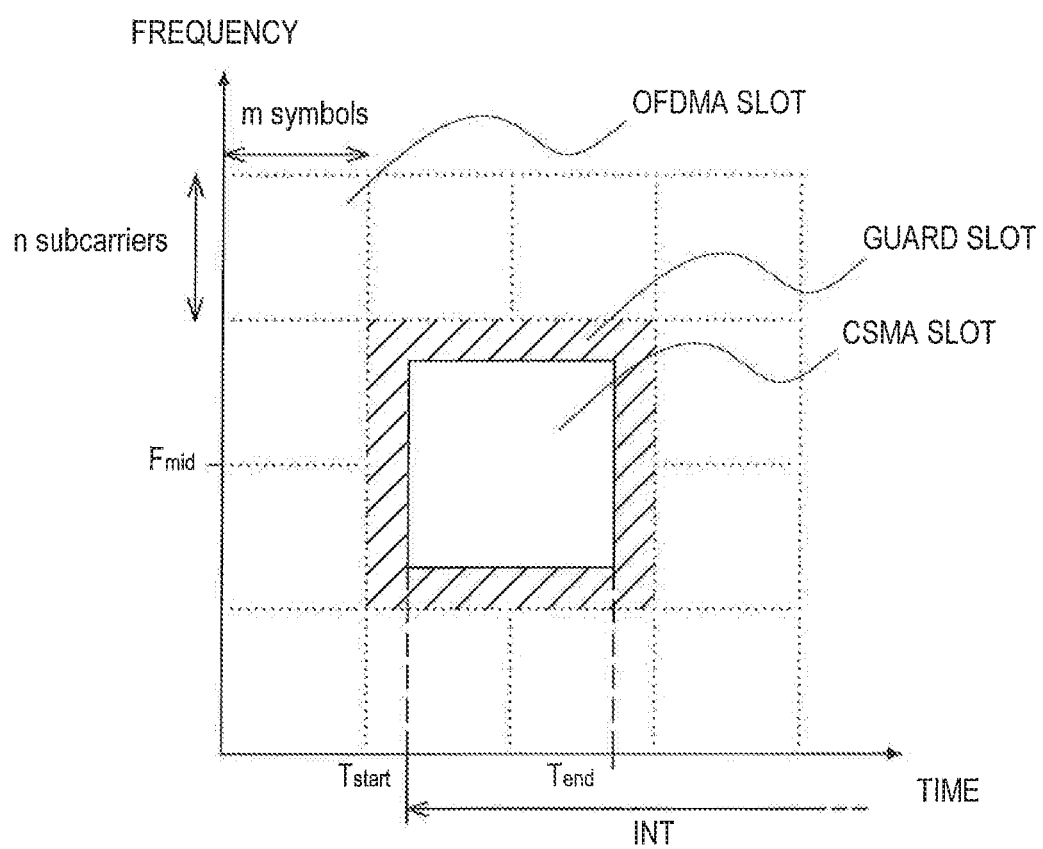
FIG. 4 is an explanatory diagram illustrating an example of a resource arrangement when communication resources are shared.

FIG. 4 is an explanatory diagram illustrating an example of a resource arrangement when communication resources are shared in this embodiment. Referring to FIG. 4, a resource arrangement is shown in a time-frequency domain of which a horizontal axis is a time axis and of which a vertical axis is a frequency axis. In the drawing, one cell surrounded by dotted lines denotes the minimum unit of scheduling in OFDMA, and there are cases in which this cell is referred to as a resource block. The minimum unit of one round of scheduling can include n sub-carriers and m symbols. Among these communication resources, the secondary usage node 20 of the first-order second communication service distributes, for example, a CSMA slot of a center frequency $F_{mid}$ in a section from a start timing $T_{start}$ to an end timing $T_{end}$ at intervals INT for the second-order second communication service. The start timing $T_{start}$ and the end timing $T_{end}$ are designated by using, for example, a reference signal transmitted from the secondary usage node 20 of the first-order second communication service as a reference. In addition, these timings can be corrected between the secondary usage nodes 20 by the synchronization signal supplied from the communication control unit 100. The secondary usage node 20 of the first-order second communication service transmits, for example, information including the start timing $T_{start}$, the end timing $T_{end}$, the center frequency $F_{mid}$, and the interval INT to the communication control device 100 as shared resource information for specifying a range of sharable communication resources.

In addition, as exemplified in FIG. 4, the secondary usage node 20 of the first-order second communication service may install a guard slot between communication resources distributed to the second-order second communication service (a CSMA slot) and the surrounding communication resources for the first-order second communication service (OFDMA slots). In this way, even when the first-order and second-order second communication services are not fully synchronized, or there is an error in a frequency used as a reference, the first-order and second-order second communication services can favorably share communication resources without interfering with each other.

In addition, when, for example, there is a large amount of traffic for the first-order second communication service, and there are not enough spare communication resources, the secondary usage node 20 of the first-order second communication service may reject sharing of communication resources. On the other hand, when there are enough spare communication resources, or some slots are not used for a long time period due to the influence of frequency selective fading, or in other similar situations, sharing of communication resources can be accepted.

[2-2. Example of Location Relationship Between Service Areas]

Location relationships between service areas based on which the control unit 140 makes an adjustment between second communication services are classified into, for example, four classes (referred to as class A, class B, class C and class D) exemplified in FIG. 5 to FIG. 8.

(Class A)

Figure 5:
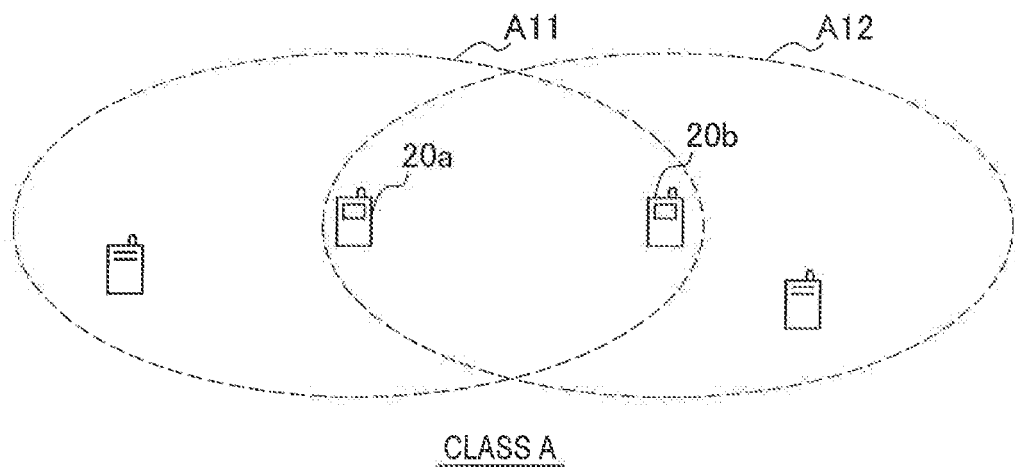
FIG. 5 is an explanatory diagram illustrating a first example of a location relationship between service areas of second communication services.

Referring to FIG. 5, an example of a location relationship between service areas that belongs to class A is shown. In FIG. 5, a service area A11 of the secondary usage node 20*a* and a service area A12 of the secondary usage node 20*b* overlap. In addition, the secondary usage node 20*b* is included in the service area A11 of the secondary usage node 20*a*. Likewise, the secondary usage node 20*a* is included in the service area A12 of the secondary usage node 20*b*. In such a location relationship, radio waves transmitted by these adjacent secondary usage nodes 20*a* and 20*b* become mutual interference factors, and there is a probability that a problem will occur in secondary usage, in addition, a case in which only one of the two secondary usage nodes 20 is included in a service area of the other may be included in class A.

For example, when service areas of two second communication services have the location relationship of class A, the control unit 140 further determines whether or not there is a common radio access technique that can be used by the two secondary usage nodes 20*a* and 20*b* which provide the two second communication services respectively. For example, when the secondary usage node 20*a* can use radio access techniques R1 and R2, and the secondary usage node 20*b* can use the radio access technique R1, the radio access technique R1 is determined as a common radio access technique. When there is a common radio access technique as mentioned above, the control unit 140 recommends that the secondary usage nodes 20*a* and 20*b* use the common radio access technique and a common channel. In this way; for example, the communication services are caused to coexist, or a mesh network is formed between the secondary usage nodes 20*a* and 20*b*, so that the second communication services can be managed without interfering with each other. For example, 11s in the IEEE802.22, Ecma392, and IEEE802.11 families, 16j in the IEEE802.16 (WiMax) family, and the like support a mesh protocol or a protocol for exchanging scheduling information. Accordingly, communication services can coexist between communication services that employ these radio access techniques. There is a case in which the IEEE802.11 family supports a function for acquiring resource usage information about an adjacent network through an access point or a terminal in a method such as beacon request using a public action frame, and the like. In this case also, communication services can coexist in the same way. Even if usable radio access techniques are different (not the same), when a combination of which the radio access techniques is a combination of which the radio access techniques can coexist, the control unit 140 can cause two communication services to coexist in a common channel. This is the same for the other classes that will be described below. Also, when usable radio access techniques are different from each other and are not able to coexist, the control unit 140 recommends that the secondary usage node 20*a* or 20*b*, which provides one second communication service, use a second channel that is different from a first channel used by the other second communication service. At this time, it is more preferable that the second channel not be adjacent to the first channel on the frequency axis because interference by out-of-band radiation is also prevented. In this way, it is possible to separately manage the second communication service of the secondary usage node 20*a* and the second communication service of the secondary usage node 20*b* without them interfering with each other.

(Class B)

Figure 6:
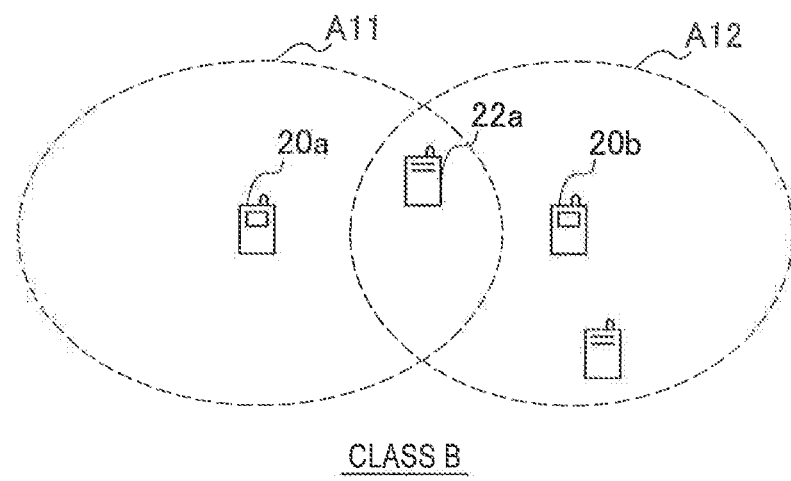
FIG. 6 is an explanatory diagram illustrating a second example of a location relationship between service areas of second communication services.

Referring to FIG. 6, an example of a location relationship between service areas that belongs to class B is shown. In FIG. 6, the service area A11 of the secondary usage node 20*a* and the service area A12 of the secondary usage node 20*b* overlap. However, the secondary usage node 20*b* is not included in the service area A11 of the secondary usage node 20*a*, and the secondary usage node 20*a* is not included in the service area A12 of the secondary usage node 20*b*. In such a location relationship, radio waves interfere with a terminal device 22*a* located in the overlapping area, and there is a probability that a partial problem will occur in secondary usage.

For example, when service areas of two second communication services have the location relationship of class B, the control unit 140 further determines whether or not there is a common radio access technique that can be used by the two secondary usage nodes 20*a* and 20*b* which provide the two second communication services respectively. When there is a common usable radio access technique, the control unit 140 recommends that the secondary usage nodes 20*a* and 20*b* use the common radio access technique and a common channel. In this way, like in the case of class A, it is possible to manage the second communication services without them interfering with each other. However, in the case of class B, the secondary usage nodes 20*a* and 20*b*, are not able to directly receive signals transmitted by the counterparts. For this reason, in this case, the control unit 140 causes the communication unit 110 to transmit a synchronization signal to the two secondary usage nodes 20*a* and 20*b*, thereby supporting coexistence of the communication services or formation of a mesh network. Like in the case of class A, when usable radio access techniques are different and are not able to coexist, the control unit 140 recommends that the secondary usage node 20*a* or 20*b*, which provides one second communication service, use a channel (suitably, non-adjacent channel) that is different from a channel used by the other second communication service.

(Class C)

Figure 7:
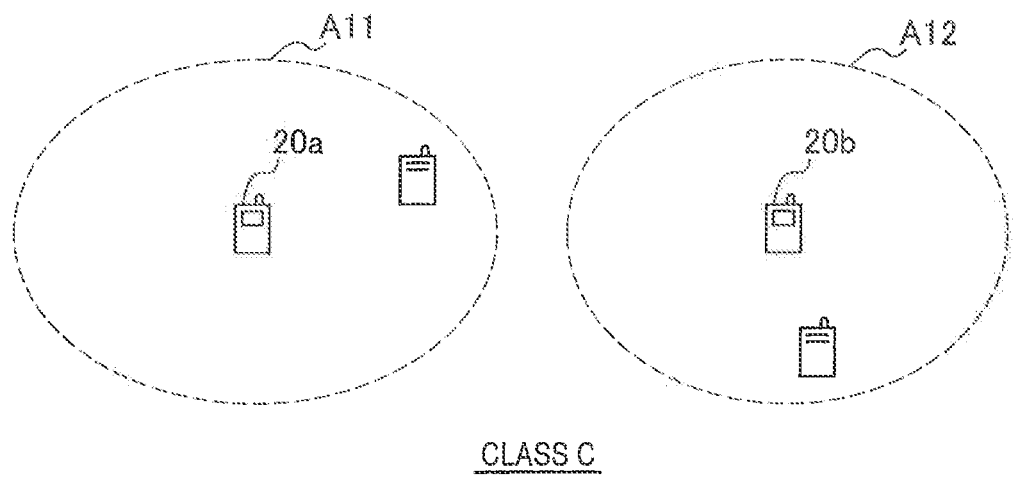
FIG. 7 is an explanatory diagram illustrating a third example of a location relationship between service areas of second communication services.

Referring to FIG. 7, an example of a location relationship between service areas that belongs to class C is shown. In FIG. 7, the service area A11 of the secondary usage node 20*a* and the service area A12 of the secondary usage node 20*b* do not overlap. In such a location relationship, the control unit 140 recommends, for example, that the two secondary usage nodes 20*a* and 20*b*, which provide two second communication services respectively; use a common channel irrespective of usable radio access techniques. In this way, it is possible to increase a selection of channels for a secondary usage node 20 that provides another second communication service (not shown). However in class C also, when mutual interference between nodes of two second communication services (for example, interference between nodes located in external boundary portions of two service areas) exceeds an allowable level, the control unit 140 may perform control for sharing communication resources, like in class A and class B described above.

In addition, the control unit 140 selects, for example, a channel to be recommended to each secondary usage node 20 from among channels indicated by permissible channel information received from the secondary usage node 20. This means that an adjustment between second communication services by the communication control device 100 can be performed within the range of regulation for secondary usage (legal regulation of each country, regulation determined between service providers, or the like). Accordingly, even when the secondary usage node 20 receives a notification from the communication control device 100 and changes a channel, there is no risk of interfering with the first communication service or other communication services that can be managed around the secondary usage node 20.

(Class D)

Figure 8:
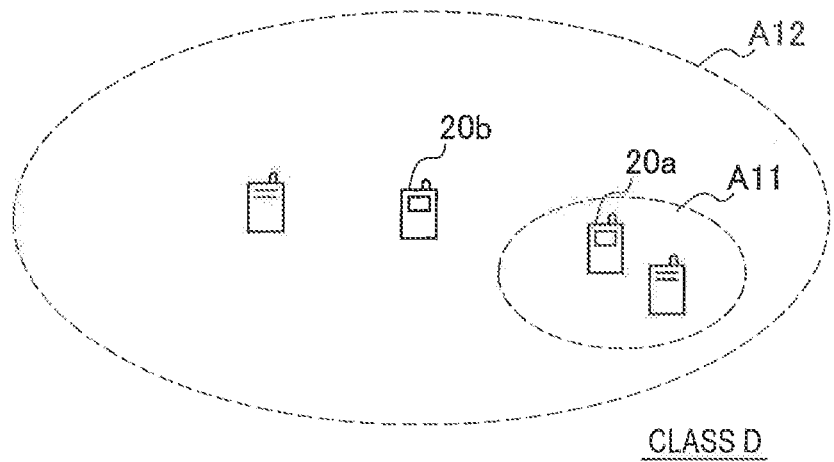
FIG. 8 is an explanatory diagram illustrating a fourth example of a location relationship between service areas of second communication services.

Referring to FIG. 8, an example of a location relationship between service areas that belongs to class D is shown. In FIG. 8, a service area A11 of the secondary usage node 20*a* is included in a service area A12 of the secondary usage node 20*b*. In such a location relationship, like in the case of class A, radio waves transmitted by these adjacent secondary usage nodes 20*a* and 20*b* become mutual interference factors, and there is a probability that a problem will occur in secondary usage.

For example, when service areas of two second communication services have the location relationship of class D, the control unit 140 first determines whether or not it is possible to use a common radio access technique and a common channel, like in the case of class A. When it is possible to use a common radio access technique and a common channel, use of the common radio access technique and the common channel can be recommended. Also, when usable radio access techniques are different and are not able to coexist, the control unit 140 determines whether or not the two second communication services can use different channels. When it is possible to use different channels, use of the different channels can be recommended. In this regard, for example, when channels that have been permitted to the two secondary usage nodes 20*a* and 20*b* by the data server 40 are the same one channel, the secondary usage nodes 20*a* and 20*b* are not able to use different channels, in this case, the control unit 140 supports sharing of communication resources according to the radio access techniques that can be used by the secondary usage nodes 20*a* and 20*b*. For example, as mentioned above, when a radio access technique of the secondary usage nodes 20*b* is OFDMA, or the radio access technique of the secondary usage nodes 20*b* is OFDMA and a radio access technique of the secondary usage nodes 20*a* is CSMA, the control unit 140 may support sharing of communication resources. In this way, the two second communication services having the location relationship of class D also can favorably coexist.

Here, the communication control device 100 may support sharing of communication resources after reducing the service area A11 by lowering a transmission power of the secondary usage node 20*a* so that the location relationship between the service areas becomes class D. Also, even when the service area A11 is not fully included in the service area A12 but includes a portion located outside the service area A12, the location relationship between the service areas may be recognized as class D. Even in this case, the communication control device 100 can support sharing of communication resources according to the radio access techniques that can be used by the secondary usage nodes 20*a* and 20*b*. At this time, the communication control device 100 may avoid the risk of a radio signal transmitted from the outside of the service area A12 interfering with another communication service using, for example, technology such as transmission power control, beamforming, or the like.

[2-3. Example of Configuration of Secondary Usage Node]

Figure 9:
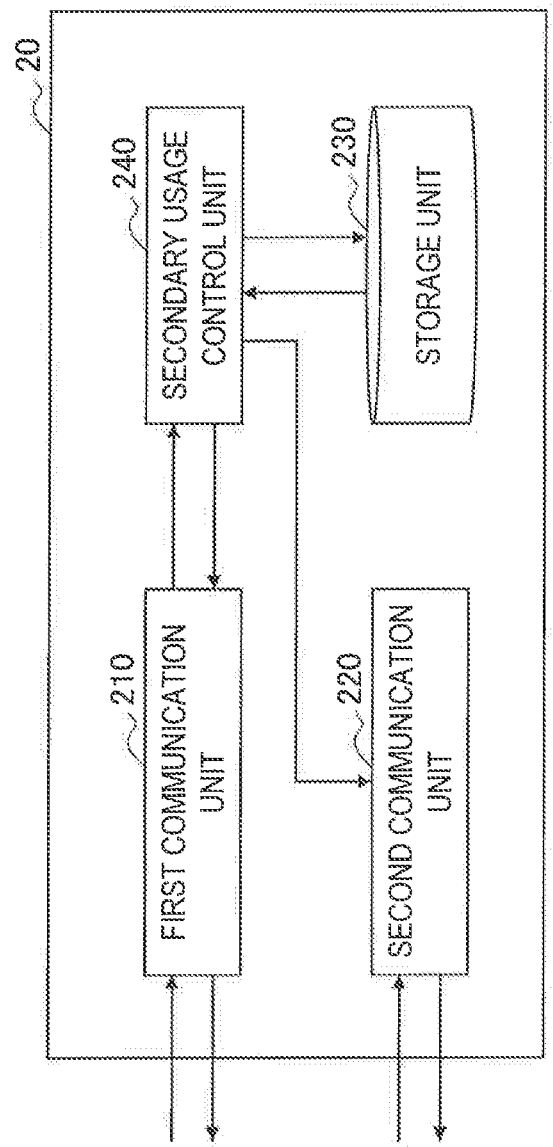
FIG. 9 is a block diagram showing an example of a configuration of a secondary usage node related to one embodiment.

FIG. 9 is a block diagram showing an example of a configuration of the secondary usage node 20 related to this embodiment. The secondary usage node 20 may be a communication device that provides an arbitrary second communication service, for example, a small or medium-sized base station, a wireless relay station, a radio access point, or the like. Thus, there is a probability that the secondary usage node 20 will have a variety of components according to its role. However, in FIG. 9, only components that are directly related to this embodiment are shown. Referring to FIG. 9, the secondary usage node 20 includes a first communication unit 210, a second communication unit 220, a storage unit 230, and a secondary usage control unit 240.

(First Communication Unit)

The first communication unit 210 is a communication interface for the secondary usage node 20 to communicate with the data server 40 and the communication control device 100. For example, according to control of the secondary usage control unit 240, the first communication unit 210 transmits a request for registration of the node information, which has been described with reference to FIG. 2, to the data server 40 and receives a registration acknowledgement of the node information. Also, for example, according to control of the secondary usage control unit 240, the first communication unit 210 transmits a request for secondary usage permission to the data server 40 and receives grant information including a response from the data server 40. Further, the first communication unit 210 transmits a request for an adjustment between second communication services, which will be described in detail later, to the communication control device 100, and receives information about a recommended service configuration that is transmitted as a result of the adjustment from the communication control device 100.

(Second Communication Unit)

The second communication unit 220 is a communication interface for the secondary usage node 20 to provide a second communication service to terminal devices around it. A radio access technique supported by the second communication unit 220 may be an arbitrary method such as IEEE802.11af, 11g or 11n, IEEE802.22, LTE, LTE-A, or the like. Access technique information that indicates the radio access technique supported by the second communication unit 220 is stored in advance in the storage unit 230.

(Storage Unit)

The storage unit 230 is implemented using a storage medium, for example, a hard disc, a semiconductor memory, or the like, in this embodiment, the storage unit 230 stores in advance the aforementioned node information that the secondary usage node 20 registers in the data server 40. Also, the storage unit 230 stores the aforementioned access technique information in advance. When the aforementioned grant information is provided from the data server 40, the storage unit 230 stores the grant information. Further, the secondary usage node 20 stores, as utilization channel information, a number of a channel that the secondary usage control unit 240 will use for the second communication service.

(Secondary Usage Control Unit)

The secondary usage control unit 240 controls a series of processes for secondary usage of a frequency band by the secondary usage node 20. For example, the secondary usage control unit 240 performs a process with the data server 40 exemplified in FIG. 2 through the first communication unit 210. Also, the secondary usage control unit 240 determines the necessity for an adjustment between second communication services, and transmits an adjustment request to the communication control device 100 when the adjustment is necessary. The case in which the adjustment between second communication services is necessary can include, for example, a case in which secondary usage is started according to permission from the data server 40, but it is not possible to obtain communication quality as expected due to interference between the second communication services. The case in which the adjustment between second communication services is necessary can further include, for example, a case in which although permission for secondary usage is received from the data server 40, another communication service has already started on the channel permitted and an opportunity for secondary usage cannot be given. An example of a process after the secondary usage control unit 240 transmits the adjustment request will be described in detail in the next chapter. Without receiving the adjustment request from the secondary usage node 20, the communication control device 100 may voluntarily make the adjustment between the second communication services in order to improve efficiency in frequency usage.

3. Flow of Process Related to One Embodiment

Next, with reference to FIG. 10 to FIG. 15, description will be made regarding the flow of a communication control process between the communication control device 100 and the plurality of secondary usage nodes 20 related to this embodiment. The communication control process described here can be performed on each combination of, for example, a secondary usage node 20 that has requested an adjustment between second communication services and one or more other secondary usage nodes 20 located around the secondary usage node 20.

[3-1. Communication Control Process]

Figure 10:
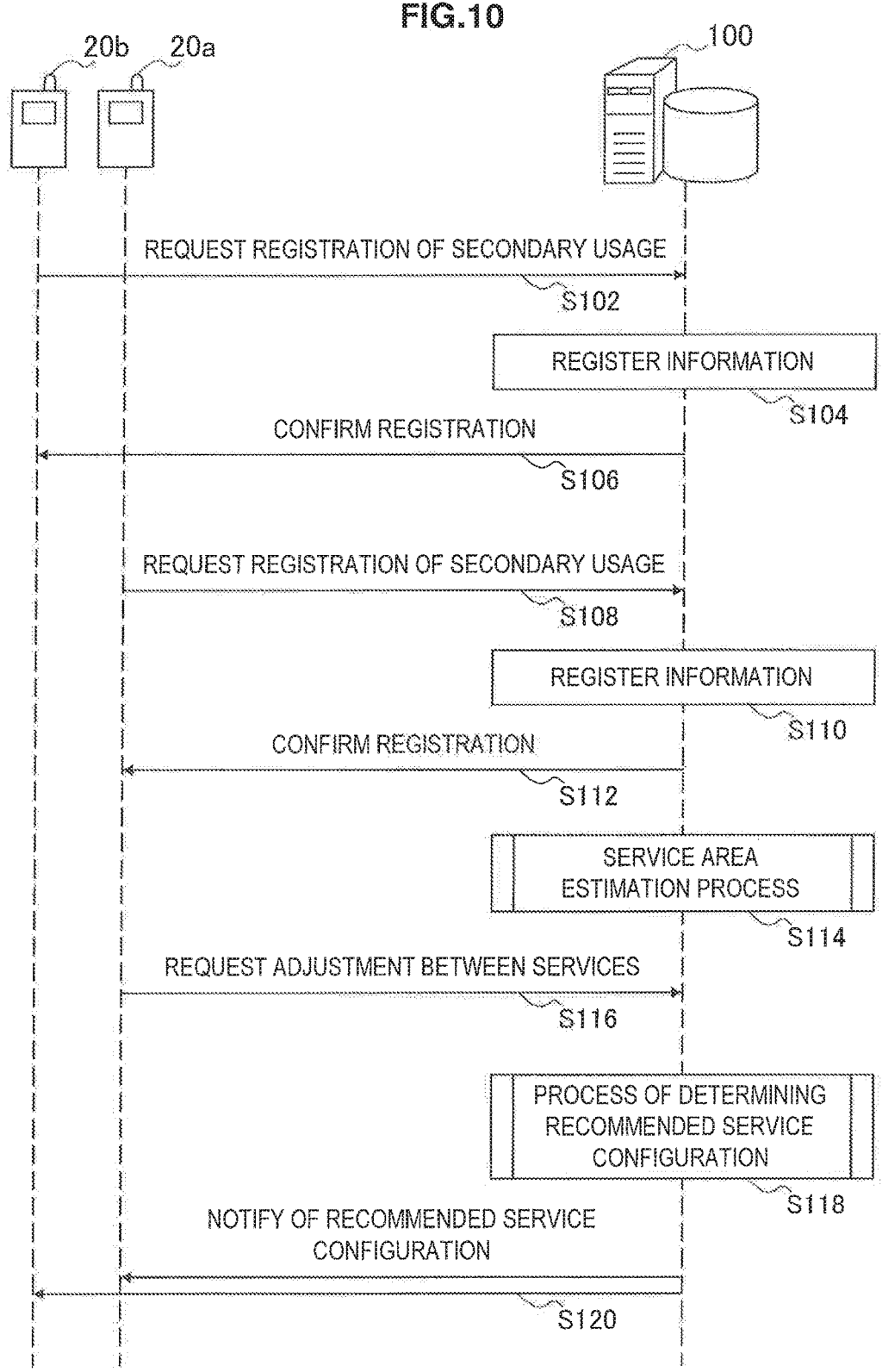
FIG. 10 is a sequence diagram showing an example of the flow of a communication control process between a communication control device and a secondary usage node related to one embodiment.

FIG. 10 is a sequence diagram showing an example of the flow of a communication control process between the communication control device 100 and the secondary usage nodes 20a and 20b related to this embodiment. It is assumed that node information has been registered in the data server 40 by the secondary usage nodes 20a and 20b before the process of FIG. 10, and permission for secondary usage has already been given to the secondary usage nodes 20a and 20b.

Referring to FIG. 10, first, the secondary usage node 20b requests the communication control device 100 to register secondary usage (step S102). As mentioned above, a registration request transmitted from the secondary usage node 20b includes service area information for estimating a service area of a second communication service provided by the secondary usage node 20b, access technique information, and the like. Then, the communication control device 100 stores the information received from the secondary usage node 20b in the storage unit 120 (step S104). The communication control device 100 transmits an acknowledgement signal (confirmation) confirming that the registration has been finished to the secondary usage node 20b (step S106).

The secondary usage node 20a requests registration of secondary usage from the communication control device 100 (step S108). The registration request transmitted from the secondary usage node 20a likewise includes service area information, access technique information, and the like. Then, the communication control device 100 stores the information received from the secondary usage node 20a in the storage unit 120 (step S110). The communication control device 100 transmits an acknowledgement signal (confirmation) confirming that the registration has been finished to the secondary usage node 20a (step S112).

Subsequently, the estimation unit 130 of the communication control device 100 estimates service areas of respective second communication services using the service area information that has been received from the respective secondary usage nodes 20a and 20b (step S114). Here, the service area estimation process by the estimation unit 130 may be performed after there is a request for an adjustment between the second communication services in step S116.

Next, when the necessity for an adjustment between the second communication services is recognized, the secondary usage node 20a requests the adjustment between the second communication services from the communication control device 100 (step S116). Here, the secondary usage node may not request the adjustment between the second communication services from the communication control device 100, but rather, the communication control device 100 may voluntarily start the adjustment between the second communication services. Subsequently, the communication control device 100 determines a configuration of the second communication services to be recommended to the secondary usage node 20a or another secondary usage node 20 (step S118). In the example of FIG. 10, the other secondary usage node 20 corresponds to the secondary usage node 20b. The communication control device 100 notifies at least one of the secondary usage node 20a and the secondary usage node 20b of the recommended service configuration (that is, a radio access technique to be used, a channel to be used, or the like) (step S120).

[3-2. Service Area Determination Process]

Figure 11:
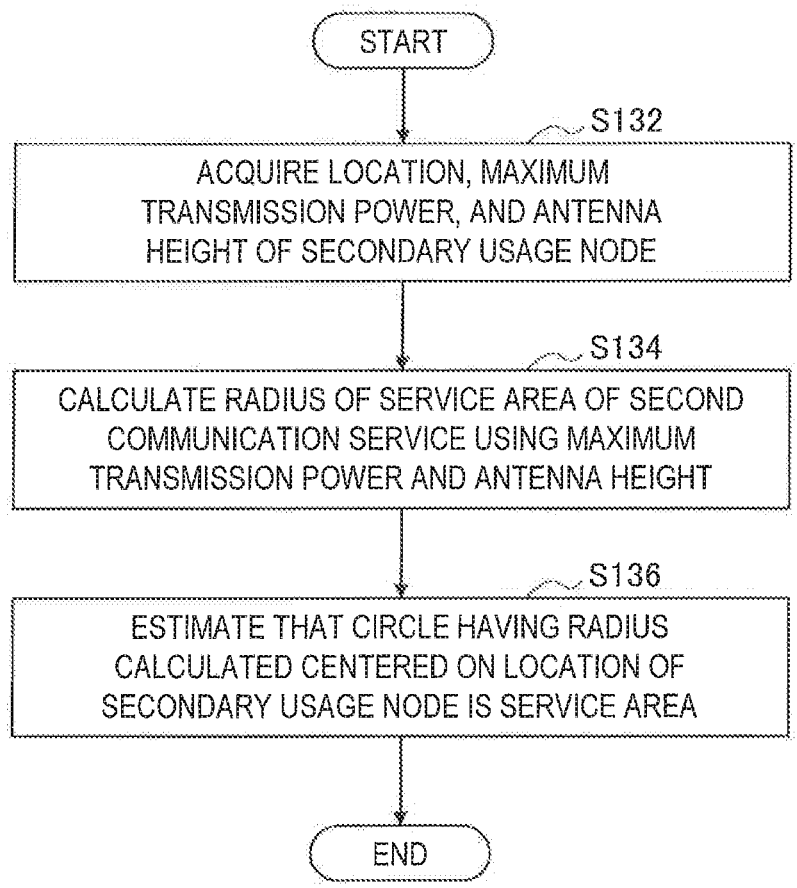
FIG. 11 is a flowchart showing an example of the flow of a service area estimation process related to one embodiment.

FIG. 11 is a flowchart showing an example of the flow of a service area estimation process by the communication control device 100 in step S114 of FIG. 10.

Referring to FIG. 11, first, the estimation unit 130 of the communication control device 100 acquires a location, a maximum transmission power, and an antenna height of the secondary usage node 20 stored in the storage unit 120 (step S132). Next, the estimation unit 130 calculates a radius of a service area of a second communication service using the maximum transmission power and the antenna height of the secondary usage node 20 (step S134). The estimation unit 130 estimates that a circular area which has the radius calculated in step S134 centered on the location of the secondary usage node 20 is the service area of the second communication service provided by the secondary usage node 20 (step S136). When it is possible to acquire additional information, for example, data about the antenna directivity of the secondary usage node 20, data of the surrounding terrain, or the like, the estimation unit 130 may estimate a service area in an oval shape or a more complex shape according to terrain, rather than a circular shape.

[3-3. Process of Determining Recommended Service Configuration]

Figure 12:
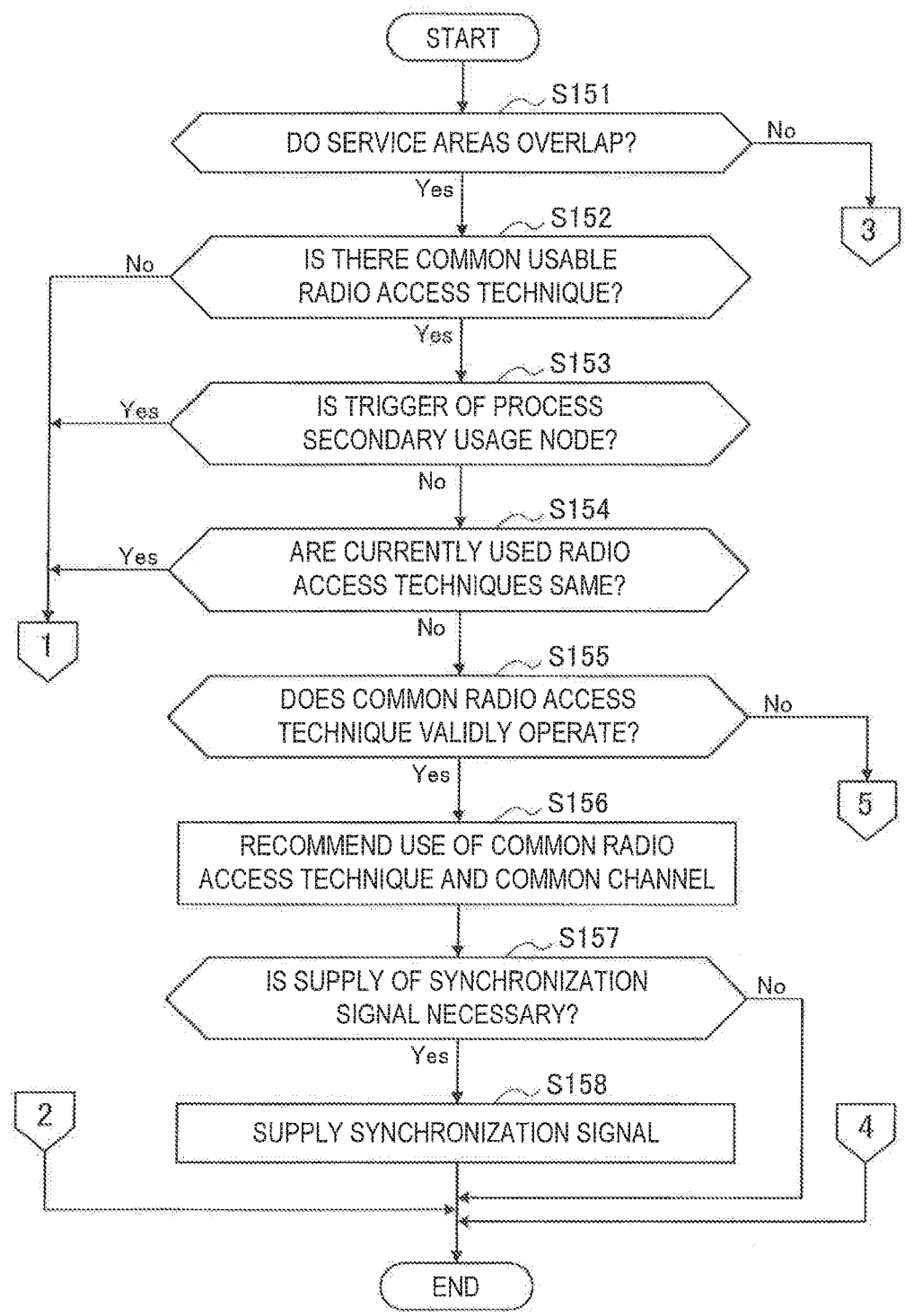
FIG. 12 is a first part of a flowchart showing an example of the flow of a process of determining a recommended service configuration related to one embodiment.
Figure 13:
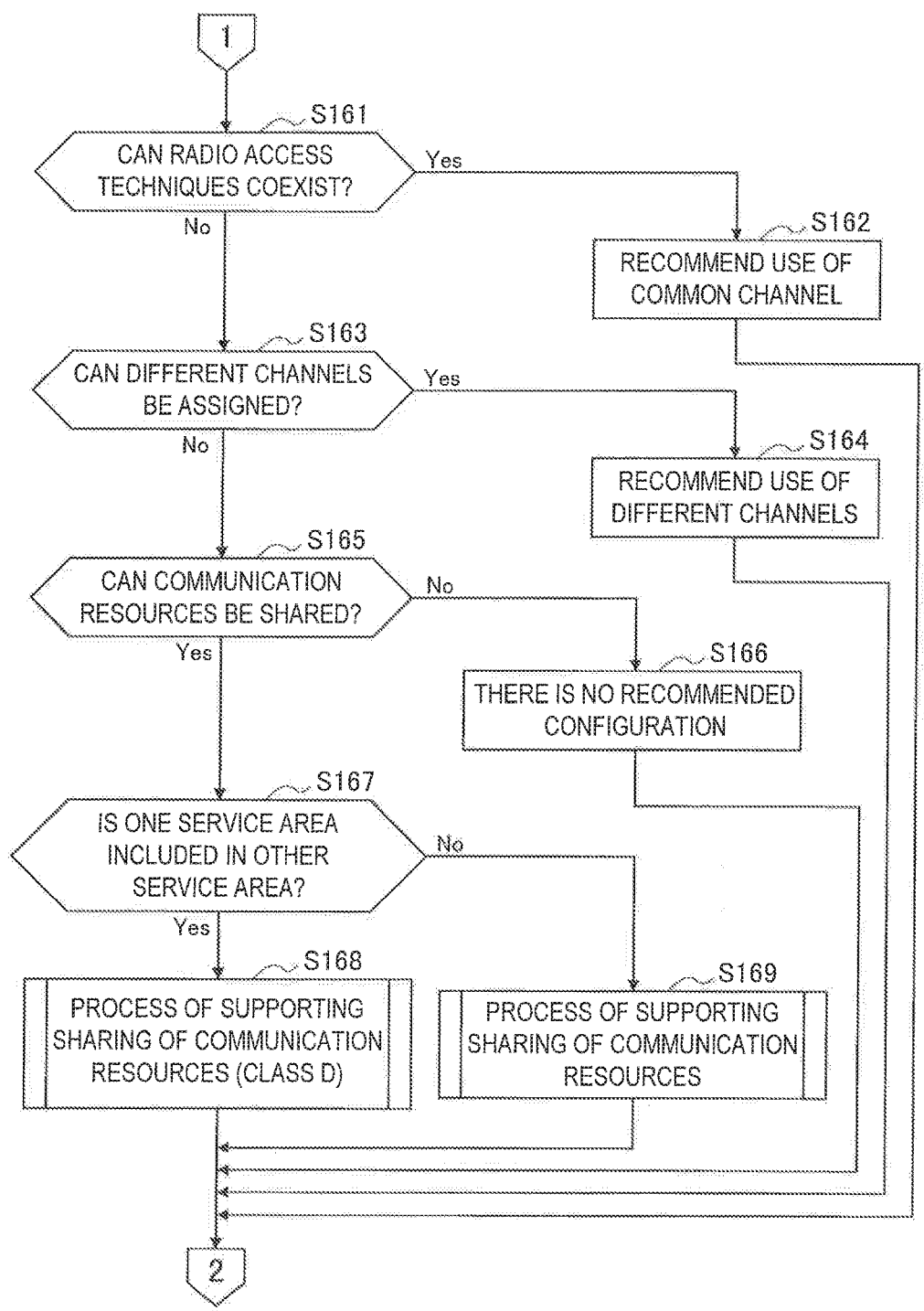
FIG. 13 is a second part of the flowchart showing an example of the flow of the process of determining a recommended service configuration related to one embodiment.
Figure 14:
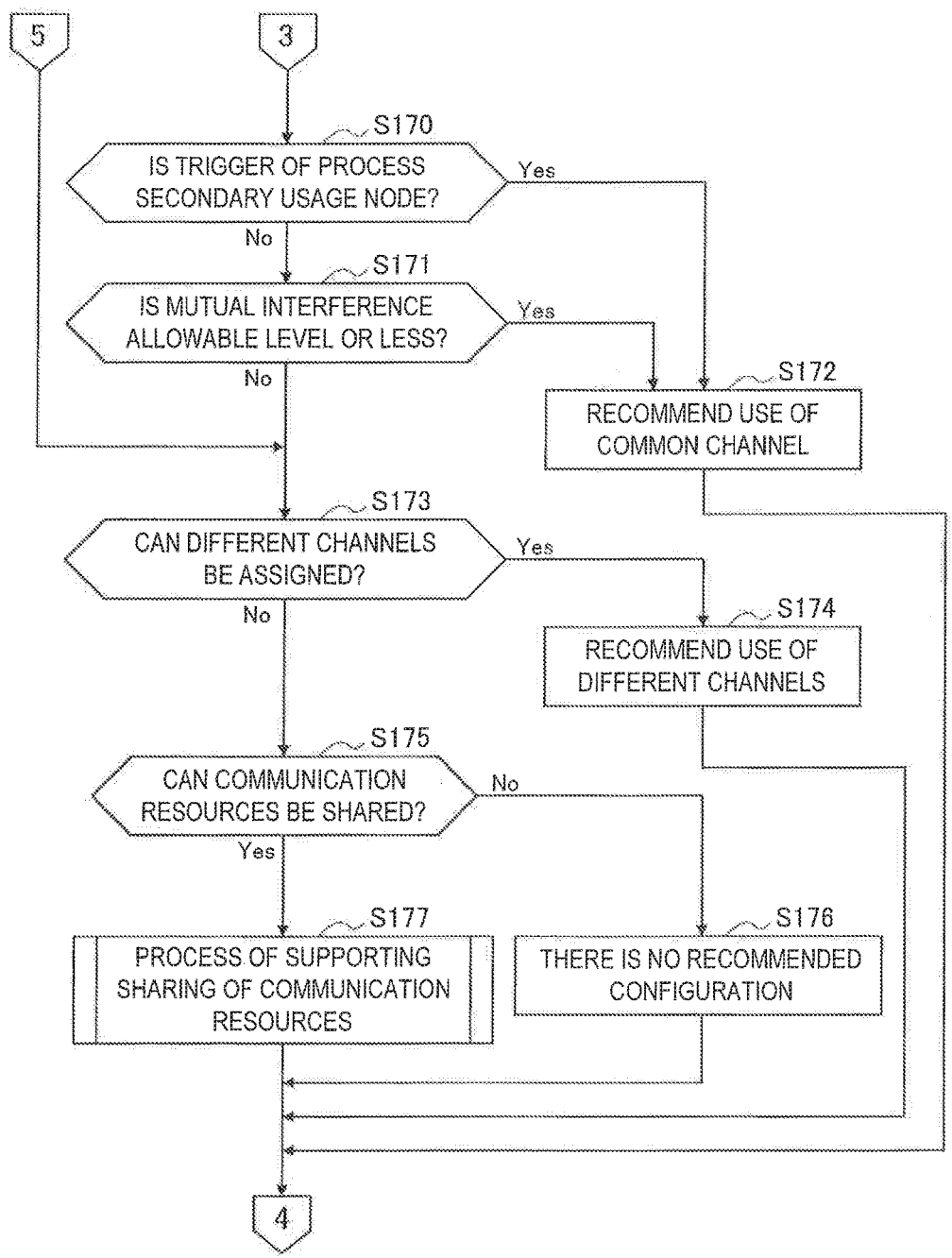
FIG. 14 is a third part of the flowchart showing an example of the flow of the process of determining a recommended service configuration related to one embodiment.

FIG. 12 to FIG. 14 are flowcharts showing an example of the flow of a process of determining a recommended service configuration by the communication control device 100 in step S118 of FIG. 10.

Referring to FIG. 12, first, the control unit 140 of the communication control device 100 determines whether or not the service areas of the two second communication services provided by the secondary usage nodes 20a and 20b overlap (step S151). Whether or not the service areas overlap may be determined on the basis of, for example, whether or not the sum of radii of the two service areas is less than the distance between the secondary usage nodes 20a and 20b. Here, when it is determined that the service areas do not overlap, the process proceeds to step S170 of FIG. 14. On the other hand, when it is determined that the service areas overlap, the process proceeds to step S152.

When the process proceeds to step S152, a location relationship between the service areas of the two second communication services belongs to any one of class A, class B and class D shown in FIG. 5, FIG. 6 and FIG. 8. In this case, the control unit 140 determines whether or not there is a common radio access technique that can be used by the two secondary usage nodes 20a and 20b (step S152). Here, when it is determined that there is no common usable radio access technique, the process proceeds to step S161 of FIG. 13. On the other hand, when it is determined that there is a common usable radio access technique, the process proceeds to step S153.

In step S153, the control unit 140 determines whether or not a trigger for the ongoing process of determining a recommended service configuration is a secondary usage node (step S153). For example, when the communication control device 100 has received a request for an adjustment between second communication services from the secondary usage node 20a and thus the process of determining a recommended service configuration has been started, it is determined that the trigger for the process of determining a recommended service configuration is a secondary usage node. In this case, the process proceeds to step S161 of FIG. 13. On the other hand, when the communication control device 100 has actively started the process of determining a recommended service configuration, the trigger for the process is not a secondary usage node, and thus the process proceeds to step S154.

In step S154, the control unit 140 determines whether or not radio access techniques that are currently being used by the two secondary usage nodes 20a and 20b are the same (step S154). Here, when it is determined that the radio access techniques that are currently being used are the same, the process proceeds to step S161 of FIG. 13. On the other hand, when it is determined that the radio access techniques that are currently being used are not the same, the process proceeds to step S155.

In step S155, the control unit 140 determines whether or not the common radio access techniques that are currently being used by the two secondary usage nodes 20a and 20b operate validly (that is, in parallel without causing a problem) (step S155). For example, when radio access techniques in which it is difficult to manage two systems in parallel are used in the situation in which the service areas overlap, the control unit 140 can determine that the common radio access techniques do not validly operate. In this case, the process proceeds to step S173 of FIG. 14. On the other hand, when it is determined that the common radio access techniques validly operate, the process proceeds to step S156.

When the process proceeds to step S156, the control unit 140 recommends that the two secondary usage nodes 20a and 20b use the common usable radio access techniques and a common channel (step S156). Also, the control unit 140 determines whether or not it, is necessary to supply a synchronization signal to the two secondary usage nodes 20a and 20b (step S157). For example, when one secondary usage node 20 is not included in a service area of the other secondary usage node 20, the location relationship between the service areas of the two second communication services corresponds to class B. In this case, when it is not possible to use a mesh protocol stack, for example, Ecma392 and the like, it is necessary to assist with synchronization between the communication services. In the case of class A or class D also, when clock deviation is large like in the IEEE802.11 family, it is preferable to assist with synchronization between the communication services. In such a situation, the control unit 140 can determine that it is necessary to supply a synchronization signal to the two secondary usage nodes 20a and 20b.

When it is determined in step S157 that it is necessary to supply a synchronization signal, the control unit 140 supplies a synchronization signal to the two secondary usage nodes 20a and 20b through the communication unit 110 (step S153). On the other hand, when it is determined in step S157 that it is unnecessary to supply a synchronization signal, the communication control device 100 does not supply a synchronization signal to these nodes.

In step S161 of FIG. 13, the control unit 140 determines whether or not there is a combination of radio access techniques that can be used by the two secondary usage nodes 20a and 20b and can also coexist with each other on a common channel in an overlapping service area (step S161). For example, in a frame format of the standard specification of IEEE802.22, a "Coexistence Beacon Period" for exchanging information between a plurality of communication services is installed. The secondary usage nodes 20a and 20b form a mesh network by exchanging scheduling information, path information, or the like using, for example, the "Coexistence Beacon Period," or exchange control information so that timings of scheduling do not overlap, and thereby may cause the two communication services to coexist. When it is determined that there is a combination of radio access techniques that can coexist, the control unit 140 recommends use of the radio access techniques and a common channel (step S162). On the other hand, when there is no combination of radio access techniques that can coexist, the process proceeds to step S163.

In step S163, the control unit 140 determines whether or not it is possible to assign different channels to the two second communication services (step S163). Here, when it is possible to assign different channels to the two second communication services, the control unit 140 recommends that the secondary usage nodes 20a and 20b use the different channels (step S164). For example, when permissible channel information from the secondary usage nodes 20a and 20b include the channels F1 and F2 in common, the channel F1 can be recommended to the secondary usage node 20a, and the channel F2 can be recommended to the secondary usage node 20b. On the other hand, when it is not possible to assign different channels to the two second communication services, the process proceeds to step S165.

In step S165, the control unit 140 determines whether or not sharing of communication resources becomes possible by supporting sharing of the communication resources of the two second communication services (step S165). For example, when it is possible to cause the two communication services to coexist in a time division method by supplying a synchronization signal to the secondary usage nodes 20*a* and 20*b*, it can be determined that sharing of the communication resources is possible. In this case, the process proceeds to step S167. On the other hand, when it is determined that sharing of the communication resources is not possible, the process proceeds to step S166. In step S166, since no recommendable combination is found, the control unit 140 notifies the secondary usage node 20*a* that no recommendable combination is found.

In step S167, the control unit 140 determines whether or not a service area of one second communication service is included in a service area of the other second communication service (step S167). For example, when a difference in radius between the two service areas is larger than a distance between the secondary usage nodes 20*a* and 20*b*, it is possible to determine that a service area of one second communication service is included in a service area of the other second communication service. In this case, the process proceeds to step S168. On the other hand, when it is determined that a service area of one second communication service is not included in a service area of the other second communication service, the process proceeds to step S169. Here, even if it is determined that a service area of one second communication service is not included in a service area of the other second communication service, for example, when a ratio of the corresponding portion does not exceed a predetermined value, the determination result of step S167 can be "Yes."

When the process proceeds to step S168, the location relationship between the service areas of the two second communication services belongs to class D shown in FIG. 8. Also, communication resources can be shared. Such a combination of radio access techniques includes, for example, a combination of OFDMA and CSMA. For example, when a radio access technique of a second communication service having a larger service area is OFDMA, communication resources of the two second communication services can be shared by arranging the communication resources as described with reference to FIG. 4. Here, the control unit 140 implements sharing of communication resources by performing a process of supporting sharing of communication resources exemplified in FIG. 15 (step S168).

When the process proceeds to step S169, the location relationship between the service areas of the two second communication services belongs to any one of classes A and B shown in FIG. 5 and FIG. 6. Also, communication resources can be shared. Even in this case, the control unit 140 implements sharing of communication resources by performing time same process of supporting sharing of communication resources as in the example of FIG. 15 (step S169).

When the process proceeds to step S170 of FIG. 14, the location relationship between the service areas of the two second communication services belongs to class C shown in FIG. 7. In this case, the control unit 140 determines whether or not a trigger for the ongoing process of determining a recommended service configuration is a secondary usage node (step S170). Here, when the trigger for the process of determining a recommended service configuration is a secondary usage node, the process proceeds to step S172. On the other hand, when the trigger for the process of determining a recommended service configuration is not a secondary usage node, the process proceeds to step S171. In step S171, the control unit 140 determines whether or not mutual interference between the nodes of the two second communication services is an allowable level or less (step S171). For example, the control unit 140 estimates an interference level between the two second communication services on the basis of transmission powers of the respective second communication services and path loss according to the distance between the nodes. At this time, a margin for absorbing an estimation error may be included in the estimation result of the interference level. Also, the control unit 140 compares the estimated interference level with the allowable interference level according to necessary communication quality (a minimum SINR and the like) of each secondary communication service. On the basis of the results, the control unit 140 can determine whether or not mutual interference between the nodes is the allowable level. Alternatively, a node of a second communication service may measure an actual interference level, and the communication control device 100 may receive the measurement result for comparison with the allowable interference level. Also, a node of a second communication service may report a result of comparison between an actual interference level and the allowable interference level to the communication control device 100. Here, when the mutual interference between the nodes of the two second communication services does not exceed the allowable level, the process proceeds to step S172. In step S172, the control unit 140 recommends that the secondary usage nodes 20*a* and 20*b* use a common channel irrespective of radio access techniques. On the other hand, when the mutual interference between the nodes of the two second communication services exceeds the allowable level, the process proceeds to step S171.

In step S173, the control unit 140 determines whether or not it is possible to assign different channels to the two second communication services (step S173). Here, when it is possible to assign different channels to the two second communication services, the control unit 140 recommends that the secondary usage nodes 20*a* and 20*b* use the different channels (step S174). On the other hand, when it is not possible to assign different channels to the two second communication services, the process proceeds to step S175.

In step S175, the control unit 140 determines whether or not sharing of communication resources becomes possible by supporting sharing of the communication resources of the two second communication services (step S175). Here, when it is determined that sharing of the communication resources is possible, the process proceeds to step S177. On the other hand, when it is determined that sharing of the communication resources is not possible, the process proceeds to step S176. In step S176, since no recommendable combination is found, the control unit 140 notifies the secondary usage node 20*a* that no recommendable combination is found.

Figure 15:
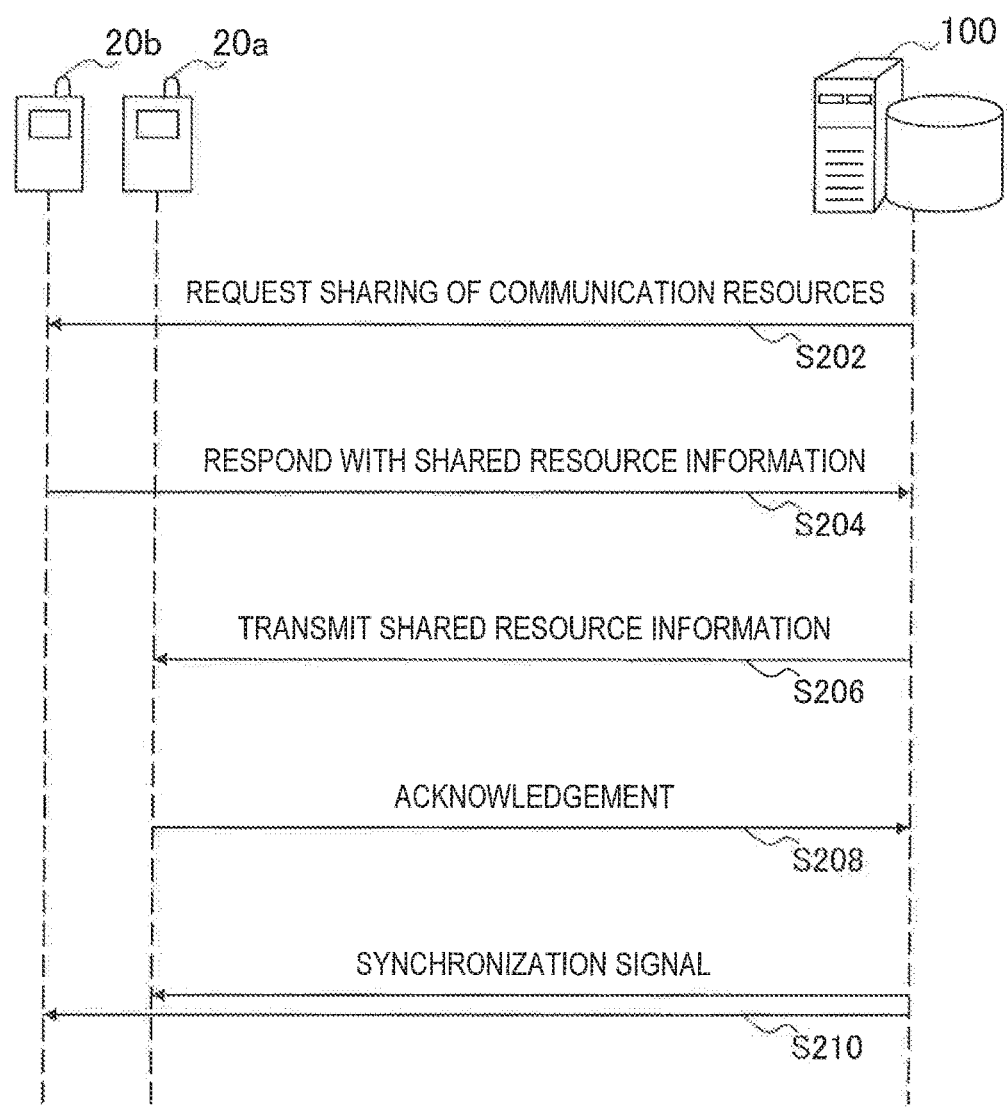
FIG. 15 is a sequence diagram showing an example of the flow of a process of supporting sharing of communication resources related to one embodiment.

In step S177, the control unit 140 implements sharing of communication resources by performing the same process of supporting sharing of communication resources as the example of FIG. 15 (step S177).

The flow of the process of determining a recommended service configuration by the communication control device 100 is not limited to the example shown in FIG. 12 to FIG. 14. In other words, some process steps shown in FIG. 12 to FIG. 14 may be omitted or integrated, or additional steps may be added. Also, the sequence of process steps may be changed. Here, an example in which the communication control device 100 adjusts a service configuration between two communication services has been mainly described. However, this embodiment can also be applied to the case of an adjustment among three or more communication services in the same way

[3-4. Process of Supporting Sharing of Communication Resources]

FIG. 15 is a flowchart showing an example of the flow of a process of supporting sharing of communication resources among the communication control device 100 and the secondary usage nodes 20a and 20b in the case of class D in step S168 of FIG. 13. Processes of supporting sharing of communication resources for other classes can also be the same as in the following example.

Referring to FIG. 15, first, the communication control device 100 requests sharing of communication resources from the secondary usage node 20b that provides a second communication service having a larger service area (step S202). This request demands provision of shared resource information that specifies a range of shamble communication resources. Then, the secondary usage node 20b determines sharable communication resources according to a traffic situation, and responds with the shared communication resources (step S204). Next, the communication control device 100 transmits the shared resource information received from the secondary usage node 20b to the secondary usage node 20a (step S206). Then, the secondary usage node 20a confirms that sharing of communication resources is possible, and transmits an acknowledgement to the communication control device 100 (step S208). The communication control device 100 supplies a synchronization signal to the secondary usage nodes 20a and 20b (step S210). Subsequently, the secondary usage node 20a manages a second-order second communication service using communication resources within the range specified by the shared resource information without the second-order second communication service and a first-order second communication service causing interference with each other.

In addition, for example, in step S206 or step S210, the communication control device 100 may transmit additional control information for preventing interference caused by sharing communication resources to the secondary usage node 20a. The additional control information can include, for example, information such as a maximum transmission power level allowed to the secondary usage node 20a, a new spectrum mask, a transmission power adjustment value for a child node of the secondary usage node 20a, and the like 4. Summarization Thus far, one embodiment of the present disclosure has been described with reference to FIG. 1 to FIG. 15. In the above-described embodiment, when at least a portion of a service area of a second-order second communication service is included in a service area of a first-order second communication service, the communication control device 100 determines whether or not sharing of communication resources is possible on the basis of radio access techniques of the first-order second communication service and the second-order second communication service. According to such a configuration, even when there are a plurality of secondary usage nodes that each want secondary usage, and service areas and permitted channels of the secondary usage nodes overlap, it is possible to improve efficiency in frequency usage or increase opportunities for secondary usage by causing communication resources to be shared.

In addition, in this embodiment, when a radio access technique of a second communication service having a larger service area is OFDMA, the communication control device 100 determines that sharing of communication resources is possible. In this case, using a scheduling method of the secondary usage node (for example, a base station for the second communication service) that employs OFDMA, communication resources can be flexibly shared in units of scheduling such as resource blocks or the like. Additionally, when a radio access technique of a second communication service having a smaller service area is CSMA, the communication control device 100 may determine that sharing of communication resources is possible. In this case, a terminal device of the second-order second communication service that employs CSMA can perform communication according to a timing in a section of communication resources distributed from the first-order second communication service in a predetermined collision avoidance (or collision detection) sequence.

Furthermore, in this embodiment, the communication control device 100 can determine whether or not sharing of communication resources is possible in response to a request from a secondary usage node that provides a second communication service, and thus opportunities for secondary usage can be given to a larger number of secondary usage nodes. In particular, when a frequency band is secondarily used, there are many cases in which it is not found in advance what kind of radio access technique each secondary usage node supports. Also, to give each secondary usage node a function for performing an adjustment between second communication services is not practical in terms of cost, and makes it difficult to ensure neutrality of the adjustment. Accordingly, provision of the neutral communication control device 100 that collects information about each secondary usage node such as a radio access technique, and the like and performs an adjustment between second communication services is useful in terms of cost and also neutrality of the adjustment.

In addition, a control process of the communication control device 100 and the secondary usage nodes 20 described in this specification can be implemented using software. Programs constituting the software that implements the aforementioned control process are contained in advance on a storage medium installed in or outside each device. Each program is read, for example, by a Random Access Memory (RAM) upon execution and executed by a processor such as a Central Processing Unit (CPU) or the like.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

REFERENCE SIGNS LIST

10 Primary usage node
20 Secondary usage node
40 Data server
100 Communication control device
110 Communication unit (communication control device)
120 Storage unit (communication control device)
130 Estimation unit (communication control device)
140 Control unit (communication control device)
210 First communication unit (secondary usage node)
220 Second communication unit (secondary usage node)
230 Storage unit (secondary usage node)
240 Secondary usage control unit (secondary usage node)

The invention claimed is:

1. A communication control device which controls communication of one or more secondary usage nodes respectively providing second communication services using a part of a frequency band assigned to a first communication service, the communication control device comprising:
   circuitry configured to:
   receive access technique information indicating radio access techniques usable by corresponding secondary usage nodes from the corresponding secondary usage nodes;
   store, in a memory, the access technique information; and
   when at least a portion of a second service area of a second-order second communication service of a second secondary usage node is included in a first service area of a first-order second communication service of a first secondary usage node, determine whether or not at least a part of communication resources can be shared between the first-order second communication service of the first secondary usage node and the second-order second communication service of the second secondary usage node based on the radio access techniques of the first-order second communication service of the first secondary usage node and the second-order second communication service of the second secondary usage node indicated by the access technique information,
   wherein the first service area corresponds to the first-order second communication service provided by the first secondary usage node, and the second service area corresponds to the second-order second communication service provided by the second secondary usage node,
   the first-order second communication service of the first secondary usage node is an orthogonal frequency-division multiple access (OFDMA) service, and
   a second radio access technique indicated by the access technique information corresponding to the second-order second communication server of the second secondary usage node is a carrier sense multiple access (CSMA) service.

2. The communication control device according to claim 1,
   wherein, if the second service area of the second-order second communication service of the second secondary usage node is not included in the first service area of the first-order second communication service of the first secondary usage node, even when a level of mutual interference between the first-order second communication service of the first secondary usage node and the second-order second communication service of the second secondary usage node exceeds an allowable interference level, the circuitry is configured to determine whether or not the part of the communication resources can be shared between the first-order second communication service of the first secondary usage node and the second-order second communication service of the second secondary usage node.

3. The communication control device according to claim 1,
   wherein the circuitry is configured to determine that the part of the communication resources can be shared between the first-order second communication service of the first secondary usage node and the second-order second communication service of the second secondary usage node.

4. The communication control device according to claim 1,
   wherein the circuitry is configured to determine that the part of the communication resources can be shared between the first-order second communication service of the first secondary usage node and the second-order second communication service of the second secondary usage node.

5. The communication control device according to claim 1,
   wherein the circuitry is configured to determine whether or not the part of the communication resources can be shared between the first-order second communication service of the first secondary usage node and the second-order second communication service of the second secondary usage node in response to a request from the second secondary usage node providing the second-order second communication service.

6. The communication control device according to claim 1,
   wherein, when it is determined that the part of the communication resources can be shared between the first-order second communication service of the first secondary usage node and the second-order second communication service of the second secondary usage node, the circuitry is configured to request the first secondary usage node providing the first-order second communication service to provide information specifying a range of the part of the communication resources.

7. The communication control device according to claim 6,
   wherein the circuitry is configured to provide the information specifying the range of the part of the communication resources received from the first secondary usage node providing the first-order second communication service to the second secondary usage node providing the second-order second communication service.

8. The communication control device according to claim 6,
   wherein, when the part of the communication resources can be shared between the first-order second communication service of the first secondary usage node and the second-order second communication service of the second secondary usage node, the circuitry is configured to supply a synchronization signal to the first and second secondary usage nodes respectively providing the first-order second communication service and the second-order second communication service.

9. The communication control device according to claim 6,
   wherein, when the part of the communication resources can be shared between the first-order second communication service of the first secondary usage node and the second-order second communication service of the second secondary usage node, the circuitry is configured to transmit control information for preventing interference caused by sharing the communication resources to the second secondary usage node providing the second-order second communication service.

10. The communication control device according to claim 1, wherein the circuitry is configured to
    estimate the first service area of the first-order second communication service and the second service area of the second-order second communication service using service area information for estimating service areas of the second communication services provided by the secondary usage nodes, and
receive the service area information from the corresponding secondary usage nodes.

11. The communication control device according to claim 1,
wherein, when no portion of the second service area of the second-order second communication service is included in the first service area of the first-order second communication service, the circuitry is configured to reduce the second service area of the second-order second communication service in order to allow the part of the communication resources to be shared between the first-order second communication service of the first secondary usage node and the second-order second communication service of the second secondary usage node.

12. A communication control method for controlling communication of a plurality of secondary usage nodes respectively providing second communication services using a part of a frequency band assigned to a first communication service, the communication control method comprising:
receiving access technique information indicating radio access techniques usable by corresponding secondary usage nodes from the corresponding secondary usage nodes;
storing the received access technique information; and
when at least a portion of a second service area of a second-order second communication service of a second secondary usage node is included in a first service area of a first-order second communication service of a first secondary usage node, determining whether or not at least a part of communication resources can be shared between the first-order second communication service of the first secondary usage node and the second-order second communication service of the second secondary usage node based on the radio access techniques of the first-order second communication service of the first secondary usage node and the second-order second communication service of the second secondary usage node indicated by the access technique information,
wherein the first service area corresponds to the first-order second communication service provided by the first secondary usage node, and the second service area corresponds to the second-order second communication service provided by the second secondary usage node,
the first-order second communication service of the first secondary usage node is an orthogonal frequency-division multiple access (OFDMA) service, and
a second radio access technique indicated by the access technique information corresponding to the second-order second communication server of the second secondary usage node is a carrier sense multiple access (CSMA) service.

13. A communication system which includes a plurality of secondary usage nodes respectively providing second communication services using a part of a frequency band assigned to a first communication service and a communication control device controlling communication of the plurality of secondary usage nodes,
wherein each of the secondary usage nodes includes:
communication circuitry that transmits access technique information indicating radio access techniques usable by corresponding secondary usage nodes to the communication control device,
wherein the communication control device includes:
circuitry configured to:
receive the access technique information from the corresponding secondary usage nodes;
store, in a memory, the access technique information; and
when at least a portion of a second service area of a second-order second communication service of a second secondary usage node is included in a first service area of a first-order second communication service of a first secondary usage node, determine whether or not at least a part of communication resources can be shared between the first-order second communication service of the first secondary usage node and the second-order second communication service of the second secondary usage node based on the radio access techniques of the first-order second communication service of the first secondary usage node and the second-order second communication service of the second secondary usage node indicated by the access technique information, and
wherein the first service area corresponds to the first-order second communication service provided by the first secondary usage node, and the second service area corresponds to the second-order second communication service provided by the second secondary usage node,
the first-order second communication service of the first secondary usage node is an orthogonal frequency-division multiple access (OFDMA) service, and
a second radio access technique indicated by the access technique information corresponding to the second-order second communication server of the second secondary usage node is a carrier sense multiple access (CSMA) service.

14. A communication device which provides a second communication service using a part of a frequency band assigned to a first communication service, the communication device comprising:
circuitry configured to:
transmit access technique information indicating a radio access technique usable by the communication device to another device in order to cause the another device to determine whether or not it is necessary to allow a part of communication resources to be shared between the second communication service of the communication device and another second communication service of another communication device; and
specify a range of communication resources to which the another second communication service of the another communication device is to be allowed to share in response to a request from the another device when the another device determines that at least a portion of a service area of the second communication service of the communication device includes another service area of the another second communication service of the another communication device, and it is necessary to allow sharing of the part of the communication resources of the second communication service of the communication device with the another second communication service of the another communication device based on the access technique information,
wherein the service area corresponds to the second communication service provided by the communication device, and the another service area corresponds to the another second communication service provided by the another communication device, the radio access technique usable by the communication device is an orthogonal frequency-division multiple access (OFDMA) service, and a second radio access technique usable by the another device is a carrier sense multiple access (CSMA) service.

15. The communication control device according to claim 6, wherein the information specifying the range of the part of the communication resources includes at least one of a start timing, an end timing, a period, and a center frequency of the part of the communication resources.

16. The communication control device according to claim 1, wherein the circuitry is configured to receive service area information including location data, antenna height, and maximum transmission power of the first secondary usage node and the second secondary usage node, and estimate the second service area of the second-order second communication service of the second secondary usage node and the first service area of the first-order second communication service of the first secondary usage node using the service area information.

* * * * *